(12) United States Patent
Suhr et al.

(10) Patent No.: US 8,134,479 B2
(45) Date of Patent: Mar. 13, 2012

(54) MONOCULAR MOTION STEREO-BASED FREE PARKING SPACE DETECTION APPARATUS AND METHOD

(75) Inventors: Jae-kyu Suhr, Bucheon (KR); Ho-gi Jung, Seoul (KR); Kwang-hyuk Bae, Seoul (KR); Jaih-he Kim, Goyang (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 407 days.

(21) Appl. No.: 12/410,126

(22) Filed: Mar. 24, 2009

(65) Prior Publication Data

US 2009/0243889 A1    Oct. 1, 2009

(30) Foreign Application Priority Data

Mar. 27, 2008 (KR) .............................. 2008-0028581

(51) Int. Cl.
*B60Q 1/48* (2006.01)

(52) U.S. Cl. ...................... 340/932.2; 340/436; 340/903

(58) Field of Classification Search ............... 340/932.2, 340/438, 435, 436, 459, 461, 995, 988, 990, 340/903
See application file for complete search history.

(56) References Cited

U.S. PATENT DOCUMENTS

| 7,039,521 B2 * | 5/2006 | Hortner et al. ................. 701/211 |
| 7,230,640 B2 * | 6/2007 | Regensburger et al. ...... 348/115 |
| 7,602,278 B2 * | 10/2009 | Prost-Fin et al. ............. 340/438 |

\* cited by examiner

*Primary Examiner* — Daniel Previl
(74) *Attorney, Agent, or Firm* — McDermott Will & Emery LLP

(57) ABSTRACT

A monocular motion stereo-based automatic free parking space detection system is disclosed. The system acquires image sequences with a single rearview fisheye camera, three-dimensionally reconstructs the vehicle rearview by using point correspondences, and recovers metric information from a known camera height to estimate the positions of adjacent vehicles thereby detecting the free parking spaces. By using de-rotation-based feature selection and 3D structure mosaicking the degradation of the 3D structure near the epipole is solved and it is not necessary to use the unreliable odometry due to its accuracy depending on road conditions.

8 Claims, 54 Drawing Sheets

MONOCULAR MOTION STEREO-BASED FREE PARKING SPACE DETECTION APPARATUS AND METHOD

CROSS-REFERENCE TO RELATED APPLICATION

This non-provisional application claims priority under 35 U.S.C §119(a) on Patent Application No. 10-2008-0028581 filed in Korea on Mar. 27, 2008, the entire contents of which are hereby incorporated by reference.

TECHNICAL FIELD

The present invention relates to a free parking detection apparatus and method. More particularly, the present invention relates to a monocular motion stereo-based free parking space detection apparatus and method for capturing the automobile rearview image and detecting from the image a free parking space.

BACKGROUND OF THE DISCLOSURE

An automatic parking system provides convenience for drivers by automatically finding free parking spaces and steering their automobiles toward them. Recently, there have been increased interests in automatic parking systems. By the customers' interests and the success stories of several automatic parking systems, many car manufacturers and component manufacturers are preparing to release self-parking products.

Automatic parking system systems consist of three components: path planning (including free parking space detection), an automatic steering and braking system used to implement the planned trajectory, and the HMI (Human Machine Interface), which can be used to receive driver's input and provide visual information of the ongoing parking process.

Free parking space detection has been implemented by using various methods: the ultrasonic sensor-based method, the laser scanner-based method, the short range radar network-based method, and the vision-based method. Among these, the vision-based method has proven the most attractive to drivers because it visualizes parking situations and performs procedures to make drivers feel safer. The vision-based method can be categorized into four approaches: the parking space marking-based approach, the binocular stereo-based approach, the light stripe projection-based approach, and the monocular motion stereo and odometry-based approach.

The first approach recognizes parking space markings. Xu et al. developed color vision-based localization of parking spaces. This method uses color segmentation based on RCE neural networks, contour extraction based on the least square method, and inverse perspective transformation. Jung et al. proposed the semi-automatic parking assist system which recognized marking lines by using the Hough transform in a bird's eye view edge image captured with a wide-angle camera. In this way, target spaces can be detected with a single image at a relatively low computational cost. Also, a general configuration of a rearview camera (a single fisheye camera) can be used. However, it cannot be used when parking space markings are not visible. Also, performance can be degraded by poor visual conditions such as stains, shadows or occlusion by adjacent vehicles.

The second approach recognizes adjacent vehicles by using a binocular stereo-based 3D reconstruction method. Kaempchen et al. developed the parking space estimation system which uses a feature-based stereo algorithm, a template matching algorithm on a depth map and a 3D fitting to the 2D planar surface model of the vehicle. This approach can easily recover metric information from the fixed length of the baseline and the camera's extrinsic parameters need not be estimated every time. However, this requires extra costs and space for the equipment because a stereo camera is not a general configuration of a rearview camera. Sub-pixel accuracy is required when there are short—baselines between the two cameras, and point correspondences are difficult to find when there are wide baselines.

Jung et al. developed a method which combines the parking space marking-based approach and the binocular stereo-based approach. These researchers used obstacle depth maps for establishing the search range and simple template matching for finding the exact location of free parking spaces. This method is robust to noise factors such as stains, trash and shadows when compared to the parking space marking-based method, but it can be only used when both obstacle depth and parking space markings are available.

The third approach recognizes adjacent vehicles by using a laser projector and a single rearview camera. Jung et al. developed a method which identified free parking spaces by analyzing the light stripe (on backward objects) produced by the laser projector. This approach can be applied to dark underground parking lots and the algorithm for acquiring 3D information is relatively simple. A general configuration of a rearview camera can be used. However, this approach cannot be used during the day due to the presence of sunlight.

The fourth approach recognizes adjacent vehicles by using a monocular motion stereo method and odometry. Fintzel et al. proposed a system which provides a rendered image from a virtual viewpoint for better understanding of parking situations and procedures. This system obtains external parameters and metric information from odometry and reconstructs the 3D structure of the parking space by using point correspondences. However, these researchers did not present a free parking space detection method. A general configuration of the rearview camera can be used. However, odometry information can be erroneous when road conditions are slippery due to rain or snow.

DISCLOSURE OF THE INVENTION

In order to solve the above-identified problems, the present disclosure proposes to acquire an image sequence by capturing the images of free parking spaces with an automobile rearview image captor or camera, three-dimensionally reconstruct view behind the automobile by using point correspondences on the image sequence, and recover metric information on the 3D structures from the known camera height and detect free parking spaces by estimating the positions of adjacent vehicles.

An embodiment of the present disclosure provides a vehicle free parking space detection apparatus comprising a feature points tracker for tracking feature points by receiving input images from an image captor and acquiring point correspondences through analyzing the input images; a three-dimensional structure generator for generating a three-dimensional structure through three-dimensionally reconstructing the free parking space by using the feature points; a three-dimensional mosaic structure generator for generating a three-dimensional structure mosaic through reselecting the feature points to reconstruct the three-dimensional structure by using a de-rotation-based feature selection and mosaic the reconstructed three-dimensional structure by estimating a similarity transformation; a metric recoverer for acquiring metric information from the three-dimensional structure mosaic by using an image captor height ratio; and a free parking space detector for detecting the free parking space by estimating the positions of adjacent vehicles in the three-dimensional structure mosaic.

Another embodiment of the present disclosure provides a vehicle free parking space detection apparatus comprising: an image captor for capturing the free parking space to generate input images and deliver the same; a user interface for displaying the detected free parking space in an output image; a free parking space detector for receiving the input images to track feature points by acquiring point correspondences through analyzing the input images, generating a three-dimensional structure through three-dimensionally reconstructing the free parking space by using the feature points, generating a three-dimensional structure mosaic through reselecting the feature points to reconstruct the three-dimensional structure by using a de-rotation-based feature selection and mosaic the reconstructed three-dimensional structure by estimating a similarity transformation, acquiring metric information from the three-dimensional structure mosaic by using an image captor height ratio, and detecting the free parking space by estimating the positions of adjacent vehicles in the three-dimensional structure mosaic to generate the detected free parking space and deliver the same; a sensor having a number of sensing units for recognizing driving conditions of the vehicle to generate and deliver vehicle driving condition information; a parking assistance controller for receiving the driving condition information from the sensor to estimate the vehicle position, generating a path plan to park the vehicle into the free parking space by using the detected free parking space delivered, and generating and delivering control signals to execute the parking into the free parking space; an active steering system for steering the vehicle in response to the control signals upon their receipt; and an active breaking system for breaking the vehicle in response to the control signals upon their receipt.

Yet another embodiment of the present disclosure provides a method for a vehicle free parking space detection apparatus to detect the free parking space comprising the steps of tracking feature points by receiving input images from an image captor and acquiring point correspondences through analyzing the input images; generating a three-dimensional structure through three-dimensionally reconstructing the free parking space by using the feature points; reconstructing the three-dimensional structure through reselecting the feature points by using a de-rotation-based feature selection; generating a three-dimensional structure mosaic through mosaicking the reconstructed three-dimensional structure by estimating a similarity transformation; acquiring metric information from the three-dimensional structure mosaic by using an image captor height ratio; and detecting the free parking space by estimating the positions of adjacent vehicles in the three-dimensional structure mosaic.

As described above, the present disclosure can solve the degradation of three-dimensional structures near the epipole by using de-rotation-based feature selection and three-dimensional structure mosaicking.

In addition, the present disclosure suggests an efficient way of locating free parking spaces in the three-dimensional point clouds.

Also, the unreliable odometry may not be used in accordance with the present disclosure because its accuracy depends largely on road conditions through estimating the external parameters by using only the image information and recovering the metric information from the ratio of the camera height in the reconstructed world and the real world.

This may implement a monocular motion stereo-based free parking space detection system.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
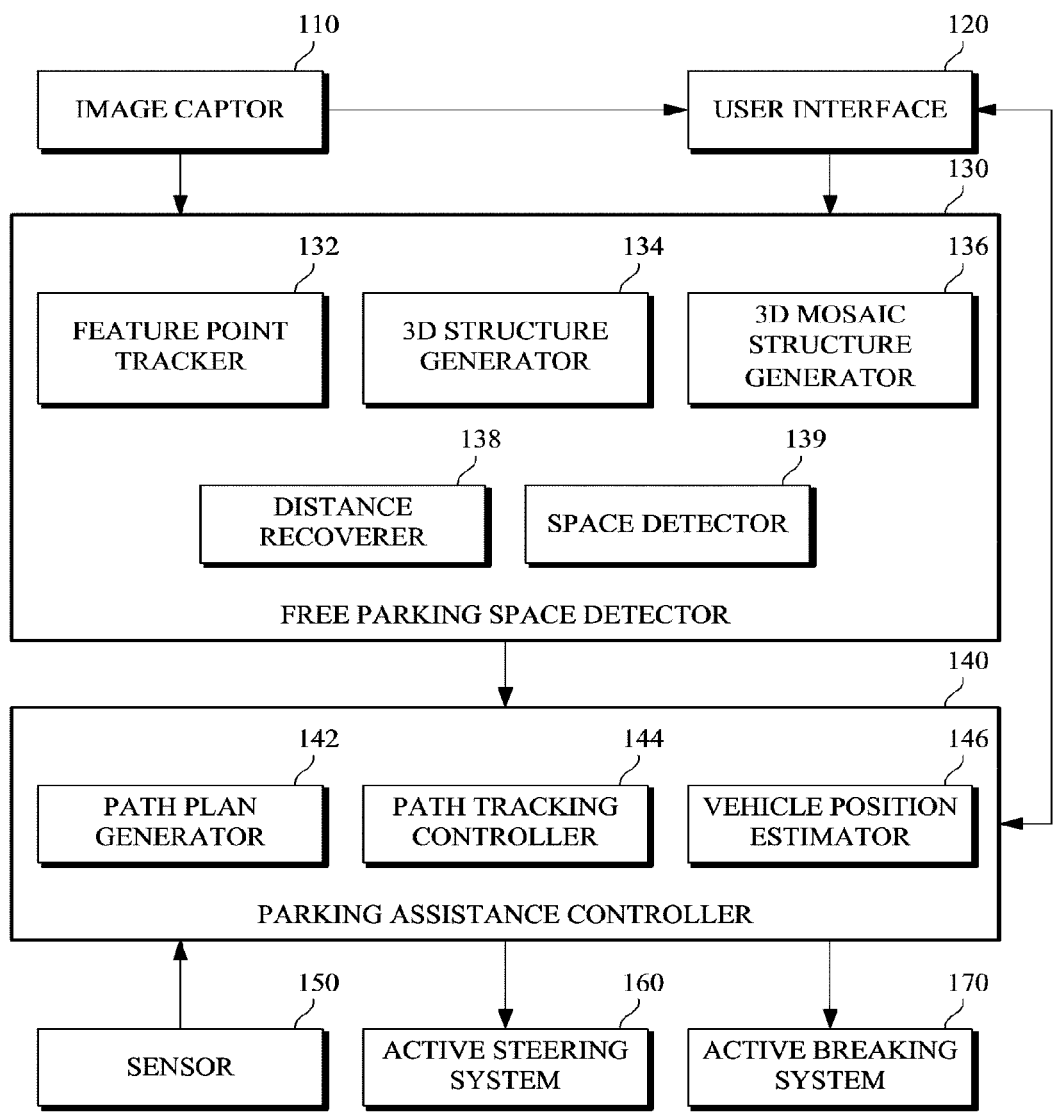
FIG. 1 is a schematic drawing of an automatic parking system using a monocular motion stereo-based free parking space detection apparatus according to an embodiment of the present invention.

Hereinafter, an exemplary embodiment of the present disclosure will be described with reference to the accompanying drawings. In the following description, the same elements will be designated by the same reference numerals although they are shown in different drawings.

Further, in the following description of the present disclosure, a detailed description of known functions and configurations incorporated herein will be omitted when it may make the subject matter of the present disclosure rather unclear.

FIG. 1 is a schematic drawing of an automatic parking system 100 using a monocular motion stereo-based free parking space detection apparatus according to an embodiment of the present invention.

The automatic parking system 100 includes an image captor 110, user interface 120, free parking space detector 130, parking assistance controller 140, sensor 150, active steering system 160 and active breaking system 170.

The image captor 110 is a means mounted on a vehicle to capture images. It may be mounted to various locations of the vehicle such as its front, rear or lateral sides so that it may capture the image of a free parking space to generate an input image for delivery to user interface 120, free parking space detector 130, parking assistance controller 140 and others. For this purpose, image captor 110 may be implemented by various image capturing apparatuses including a film camera, digital camera, digital camcorder, CCTV, etc.

The user interface 120 is a means mounted on the vehicle to input/output data or commands. It may be mounted on the vehicle near its interior, driving seat or passenger seat to receive driver's data or commands input and deliver the same to free parking space detector 130 and parking assistance controller 140, and receive and output data from and to image captor 110, free parking space detector 130 and parking assistance controller 140.

Additionally, upon receiving the input image from image captor 110 the user interface 120 displays and transfers the same to free parking space detector 130. For this purpose, user interface 120 may be implemented by various input/output devices such as a liquid crystal display or LCD, touch pad, keyboard, mouse and/or touch screen.

The free parking space detector 130 is a means for executing data communications and calculations which upon receipt of the input image from image captor 110 detects the free parking space in the input image and generate images indicative of the detected free parking space as an output image for transferring to user interface 120, which is then controlled to display the output image.

To this end, the free parking space detector 130 may comprise a feature point tracker 132, a three-dimensional structure generator 134, a three-dimensional mosaic structure generator 136, metric recoverer 138 and space detector 139.

The feature point tracker 132 tracks feature points by receiving the input images from image captor 110 and acquiring point correspondences through analyzing the input images. Here, feature point tracker detects the feature points through analyzing the input images and tracks the feature points through the input images by using the Lucas-Kanade method.

The three-dimensional structure generator 134 generates a three-dimensional structure through three-dimensionally reconstructing the free parking space by using the feature points. Here, three-dimensional structure generator 134 selects key frames of the input images, estimates motion parameters and then calculates three dimensional coordinates of the feature points by using a linear triangulation method to generate the three-dimensional structure.

The three-dimensional mosaic structure generator 136 generates a three-dimensional structure mosaic through reselecting the feature points to reconstruct the three-dimensional structure by using a de-rotation-based feature selection and mosaic the reconstructed three-dimensional structure by estimating a similarity transformation.

The metric recoverer 138 acquires metric information from the three-dimensional structure mosaic by using an image captor height ratio. Here, metric recoverer 138 acquires the image captor height ratio by determining the image captor height in the three dimensional mosaic structure through a tilting angle compensation, a density estimation-based ground plane detection, and a three-dimensional plane estimation-based ground plane refinement in its location and orientation.

The space detector 139 detects the free parking space by estimating the positions of adjacent vehicles in the three-dimensional structure mosaic. Here, the space detector 139 reduces the three dimensional structure mosaic with a top-view, deletes isolated points from neighbors, acquires outline points of the adjacent vehicles with an incoming angle and the distance from the image captor center and estimate a corner point and orientation of the adjacent vehicle, whereby detecting the free parking space.

The space detector 139 additionally estimates other adjacent vehicles located opposite the estimated vehicle by setting a circle with a predetermined radius as the search range of the other adjacent vehicles with the center of the circle being located a predetermined distance from the corner point in the orthogonal direction of the orientation.

Here, the free parking space detector 130 and its components of feature point tracker 132, three-dimensional structure generator 134, three-dimensional mosaic structure generator 136, metric recoverer 138 and space detector 139 may be implemented by an independent apparatus having memories for storing programs to perform the corresponding functions and microprocessors for executing the stored programs in the memories although their implement may be possible through software modules which are run by hardware (memories, microprocessors and the like) provided in automatic parking system 100.

A parking assistance controller 140 receives driving condition information from a sensor 150 to estimate the vehicle position, receives the detected free parking space from free parking space detector 130 and generate a path plan to park the vehicle into the free parking space, and generates control signals to execute the parking into the free parking space for transmitting the same signals to active steering system 160 and active breaking system 170.

Also, the parking assistance controller 140 may control the generated path plan to be transmitted to user interface 120 that displays the path plan as it controls the images of the parking process of the vehicle into the free parking space to be captured by image captor 110 and transmitted to user interface 120, which displays the captured images.

For this purpose, parking assistance controller 140 comprises a path plan generator 142 for generating a path plan to park the vehicle by using the detected free parking space delivered from free parking space detector 130, a path tracking controller 144 for tracking the set path plan based on the vehicle position and driving conditions to generate control signals for controlling the parking of the vehicle into the free parking space and transmit the control signals to active steering system 160 and active breaking system 170, and a vehicle position estimator 146 for estimating the vehicle position by using the driving condition information received from sensor 150.

Here, the parking assistance controller 140 and its components of path plan generator 142, path tracking controller 144 and vehicle position estimator 146 may be implemented by an independent apparatus having memories for storing programs to perform the corresponding functions and microprocessors for executing the stored programs in the memories although their implement may be possible through software modules which are run by hardware (memories, microprocessors and the like) provided in automatic parking system 100.

Sensor 150 may be provided with a number of sensor units for recognizing driving conditions of the vehicle, i.e. a wheel speed sensor, a steering angle sensor, a yaw rate sensor, acceleration sensor, etc. to sense the vehicle driving conditions and generate their equivalent electric sensor signals for vehicle driving condition information, which is to be transmitted to vehicle position estimator 146 of parking assistance controller 140.

The active steering system 160 is a steering assistance device for inducing a safe steering of the vehicle by using various sensors and control devices from driver steering inputs which steers the vehicle in response to the control signals received from parking assistance controller 140.

Although not limiting, active steering system 160 may encompass an electronic power steering system (EPS), a motor driven power steering system (MDPS), an active front steering system (AFS), etc.

The active breaking system 170 is to restrict the vehicle movement speed through changing the degree of breaking the vehicle in response to the control signal received from parking assistance controller 140 thereby halting the vehicle.

In order to achieve this, active breaking system 170 may encompass an anti-lock brake system (ABS), an electronic stability control system (ESC), etc. among others.

Figure 2:
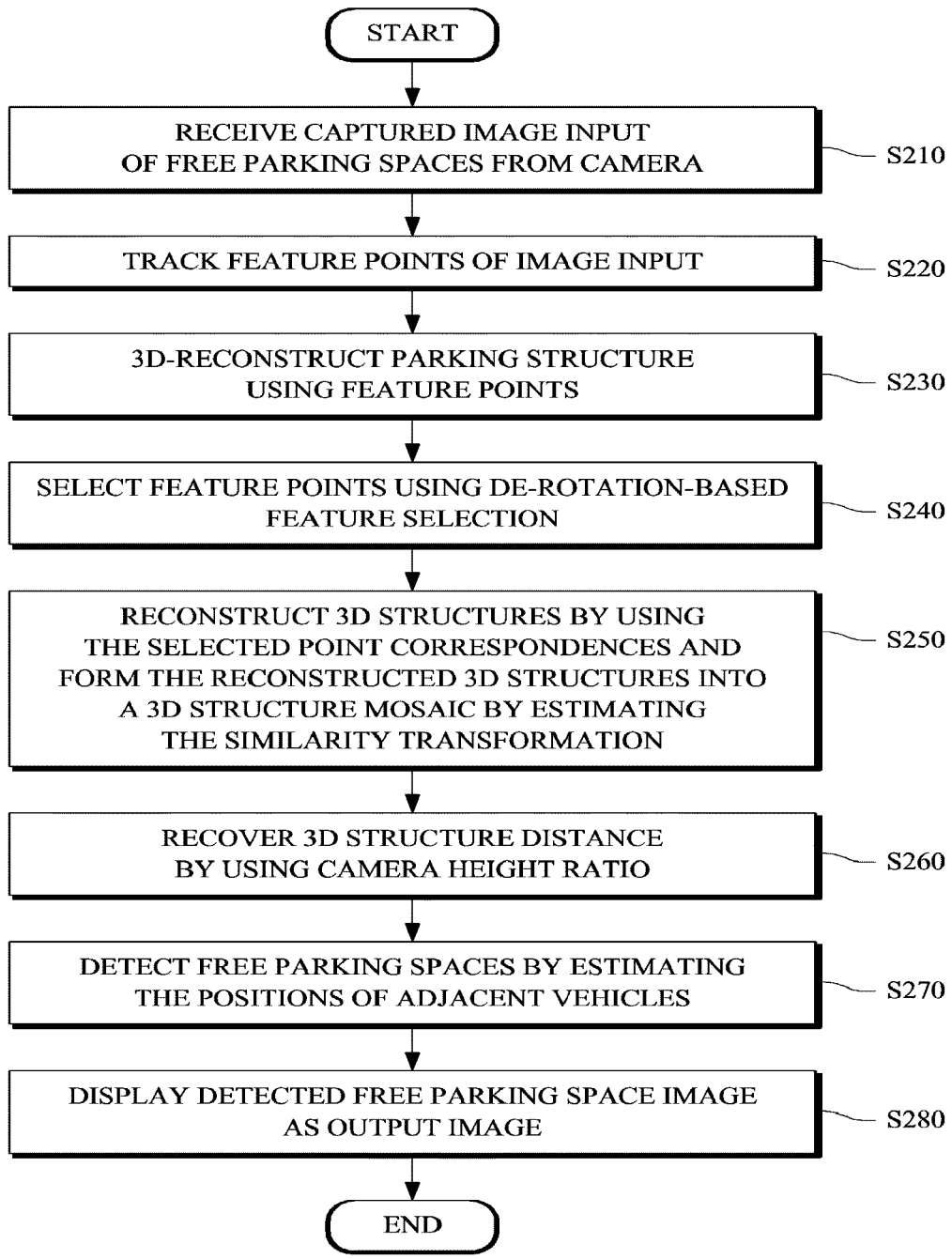
FIG. 2 is a block diagram of a monocular motion stereo-based free parking space detection method according to an embodiment of the present invention.

FIG. 2 is a block diagram of a monocular motion stereo-based free parking space detection method according to an embodiment of the present disclosure.

In the disclosed monocular motion stereo-based free parking space detection method, automatic parking system 100 in step 210 receives the captured image input of free parking spaces from image captor 110, tracks feature points of the image input in step 230, 3D-reconstructs the parking structure using the feature points in step 230, selects the feature points using the de-rotation-based feature selection in step 240, reconstructs 3D structures by using the selected point correspondences and forms the reconstructed 3D structure into a 3D structure mosaic by estimating the similarity transformation in step 250, recovers 3D structure by using the camera height ratio in step 260, and detects free parking spaces by estimating the positions of adjacent vehicles in step 270. Then, automatic parking system 100 may generate the image representing the detected free parking space as output image to transmit the same to be displayed on user interface 120 in step 280.

In the present disclosure, the rearview structures are three-dimensionally reconstructed by using a single fisheye camera and free parking spaces are found in the 3D structure through the stages of video (image sequence) acquisition, feature point tracking, 3D reconstruction, 3D structure mosaicking, metric recovery, and free parking space detection.

Compared to prior arts, the disclosed system provides three important advantages. First, the degradation of the 3D structure near the epipole is solved by using de-rotation-based feature selection and 3D structure mosaicking. This is a serious problem when reconstructing 3D structures with an automobile rearview camera because the epipole is usually located on the image of an adjacent vehicle which must be precisely reconstructed. Second, an efficient method for detecting free parking spaces in 3D point clouds is provided. Advantageously, odometry is not used for its unreliability, since the accuracy would have depended on road conditions. The external parameters may be estimated by using only the image information. The metric information may be recovered from the ratio of the camera heights in the reconstructed world and the real world.

Hereinafter, the present disclosure will be explained in detail in Sections 1 to 4. Section 1 discusses the methods for point correspondences and 3D reconstruction. Section 2 explains the problem of the epipole and offers a solution. Section 3 describes metric recovery and the free parking space detection procedure. Section 4 presents the experimental results in comparison with the laser scanner data. Incidentally, for the purpose of easy comprehension image captor 110 will be referred to as 'camera'.

1. Monocular Motion Stereo-Based 3D Reconstruction 1.1 Point Correspondences

Point correspondences in two different images acquired with a moving camera have to be found in order to estimate the motion parameters and 3D structures. In this disclosure, three different approaches are compared. The first approach finds a small number of reliable point correspondences to estimate the fundamental matrix and matches feature points by using the epipolar constraints on the rectified images. This is called guided matching, which requires the fisheye images to be undistorted and rectified.

The second approach finds point correspondences by using a naive algorithm, and rejects false matches by using an outlier rejection method designed for cameras on intelligent vehicles. Even though this approach is fast and produces few mismatches, it is difficult to find point correspondences on automobile surfaces due to the lack of features on these surfaces or featurelessness.

The third approach detects feature points and tracks them through image sequences. Since this method tracks the feature points between consecutive images, it can find many point correspondences on automobile surfaces. However, computational costs are high because the algorithm has to be applied to many images.

The first and second approaches require at least two images. The memory size for saving the images is small but it is difficult to select key frames without saving the whole sequence. The third approach also requires at least two images every moment if it is implemented in real-time by using Field-Programmable Gate Array (FPGA). Since the point correspondences are saved for each frame, key frames can be selected by using the tracking results. Considering this comparison, the third approach of tracking method is preferred in the present disclosure.

For tracking, the present disclosure chooses the Lucas-Kanade method because it produces accurate results, offers affordable computational power, and there are some existing examples of real-time hardware implementations. This method also uses the least square solution of optical flows. If I and J are two consecutive images and x and Ω denote the feature position and the small spatial neighborhood of x, respectively, then the goal is to find the optical flow vector, v which minimizes:

$$\min_{v} \sum_{x=\Omega} \{I(x) - J(x+v)\}^2 \quad (1)$$

The solution of Eq. (1), $v_{opt}$ is given by:

$$v_{opt} = G^{-1}b \quad (2)$$

$$G = \sum_{x \in \Omega} \begin{bmatrix} I_x^2 & I_x I_y \\ I_x I_y & I_y^2 \end{bmatrix},$$

-continued $$b = \sum_{x \in \Omega} \begin{bmatrix} \delta I \ I_x \\ \delta I \ I_y \end{bmatrix}$$

$I_x$ and $I_y$ are the image gradients in the horizontal and vertical directions, respectively, and $\delta I$ is the image pixel difference. Since the matrix G is required to be non-singular, the image location where the minimum eigenvalue of G is larger than the threshold may be selected as a feature point and tracked through the image sequence.

1.2.3 3D Reconstruction

Once the point correspondences are obtained, the structure of the parking space may be three-dimensionally reconstructed by using the following three steps: key frame selection, motion parameter estimation, and triangulation. For the purpose of 3D reconstruction, the key frames which determine the 3D reconstruction interval must be appropriately selected. If there is not enough camera motion between the two frames, the computation of the fundamental matrix may be inaccurate and in the opposite case, the number of corresponding points may be decreased.

The present disclosure uses a simple but less general method which uses the average length of optical flow. This method works well because rotational motion is always induced by translational motion in automobile rearview cameras. Since parking spaces should be reconstructed at the driver's request, the last frame may be selected as the first key frame.

The second key frame may be selected when the average length of optical flow from the first key frame exceeds the threshold. The next key frame may be selected in the same way. The threshold value may be set to 50 pixels and this makes the baseline length approximately 100~150 cm.

Once the key frames are selected, the fundamental matrix is estimated to extract the relative rotation and translation values between the two cameras. For this task, the present disclosure uses the Random Sample Consensus (hereinafter referred to as RANSAC) followed by the M-Estimator. Torr and Murray found this to be an empirically optimal combination. Also, with automobile rearview images experiments were performed using the various methods suggested by Armangue, X., Salvi, J.: Overall view regarding fundamental matrix estimation. Image Vision Computing 21(2), 205-220 (2003).

The RANSAC is based on randomly selecting a set of points to compute the candidates of the fundamental matrix by using a linear method. This method calculates the number of inliers for each fundamental matrix and chooses the one which maximizes it. In the experiments, once the fundamental matrix was determined, it was refined by using all the inliers. The M-Estimator may be used to reduce the effect of the outliers by measuring the residual value of each point correspondence. It is considered that $r_i$ is the residual value of $x'_i{}^T F x_i$, where $x'_i$ and $x_i$ are the coordinates of the point correspondences in two images and F is the fundamental matrix. Then, the M-Estimators may be based on solving Eq. (3):

$$\min_F \sum_i w_i (x_i'^T F x_i)^2 \qquad (3)$$

in which $w_i$ is a weight function and Huber's function is used in Eq. (4):

$$w_i = \begin{cases} 1 & |r_i| \leq \sigma \\ \sigma/|r_i| & \sigma < |r_i| \leq 3\sigma \\ 0 & 3\sigma < |r_i| \end{cases} \qquad (4)$$

In order to obtain $\sigma$, the robust standard deviation in Eq. (5) may be used:

$$\sigma = 1.4826\{1+5/(n-7)\} \text{median}_i |r_i| \qquad (5)$$

The essential matrix may be calculated by using the fundamental matrix and the camera intrinsic parameters matrix (K). The camera intrinsic parameters are pre-calibrated because they do not change in the present disclosure. The four combinations of the rotation matrix (R) and the translation vector (t) may be extracted from the essential matrix. Since only the correct combination may allow the 3D points to be located in front of both cameras, randomly selected several points are reconstructed to determine the correct combination. After that, the 3D coordinates of each point correspondence may be calculated by using a linear triangulation method. If P and P' represented the projection matrices of the two cameras and X represented the 3D coordinate of the point correspondences, Eq. (6) would have appeared as follows:

$$x \times (PX) = 0$$

$$x' \times (P'X) = 0 \qquad (6)$$

By combining the above two equations into the form $AX=0$ the 3D coordinates (X) may be simply calculated by finding the unit singular vector corresponding to the smallest singular value of A. This can be solved by using a singular value decomposition (SVD). The matrix A may be expressed as:

$$A = \begin{bmatrix} xp^{3T} - p^{1T} \\ yp^{3T} - p^{2T} \\ x' p'^{3T} - p'^{1T} \\ y' p'^{3T} - p'^{2T} \end{bmatrix} \qquad (7)$$

$p^{iT}$ and $p'^{iT}$ represent the i-th rows of P and P', respectively, and $[x, y]^T$ and $[x', y',]^T$ represent the image coordinates of the point correspondences. For 3D reconstruction, it is preferred not to use a complex optimization algorithm such as a bundle adjustment because the computational cost would be too high.

2. Feature Selection and 3D Structure Mosaicking 2.1 Degradation of 3D Structure Near the Epipole When reconstructing 3D structures in general, heavy degradation can appear near the epipole. This is because triangulation has to be performed at a small angle, since the accuracy of the 3D coordinates is degraded because of the relatively high point detection and image quantization errors. This can be shown as a rank deficiency of the matrix A in Eq. (7). If the projection matrices of the two cameras are represented by P and P', respectively, they can be written as:

$$P = K[I|0] = [K|0]$$

$$P' = K[R|t] = [KR|e] \qquad (8)$$

K and I represent a 3×3 camera intrinsic parameter matrix and a 3×3 identity matrix, respectively, and R and t represent a 3×3 rotation matrix and a 3×1 translation vector. e is the epipole. Since the last column of P' represents the coordinates of the epipole, the last column of A becomes closer to zero when the point correspondence nears the epipole.

Even though this problem is very serious in 3D reconstruction, it has not really been dealt with in the prior arts because of two reasons. First, the epipole is not located inside the image in many applications because of camera configurations. This happens when the 3D structures are reconstructed by using a stereo camera or a single moving camera whose translation in the optical axis is not more than the translations in the other axes. Second, the epipole is located inside the image but it is not on the target objects. This happens when a mobile robot with a single forward (or backward) looking camera moves along a road or corridor. In this case, the epipole is located inside the image but it is usually on objects far from the camera, so the region around the epipole is not interesting.

Figure 3:
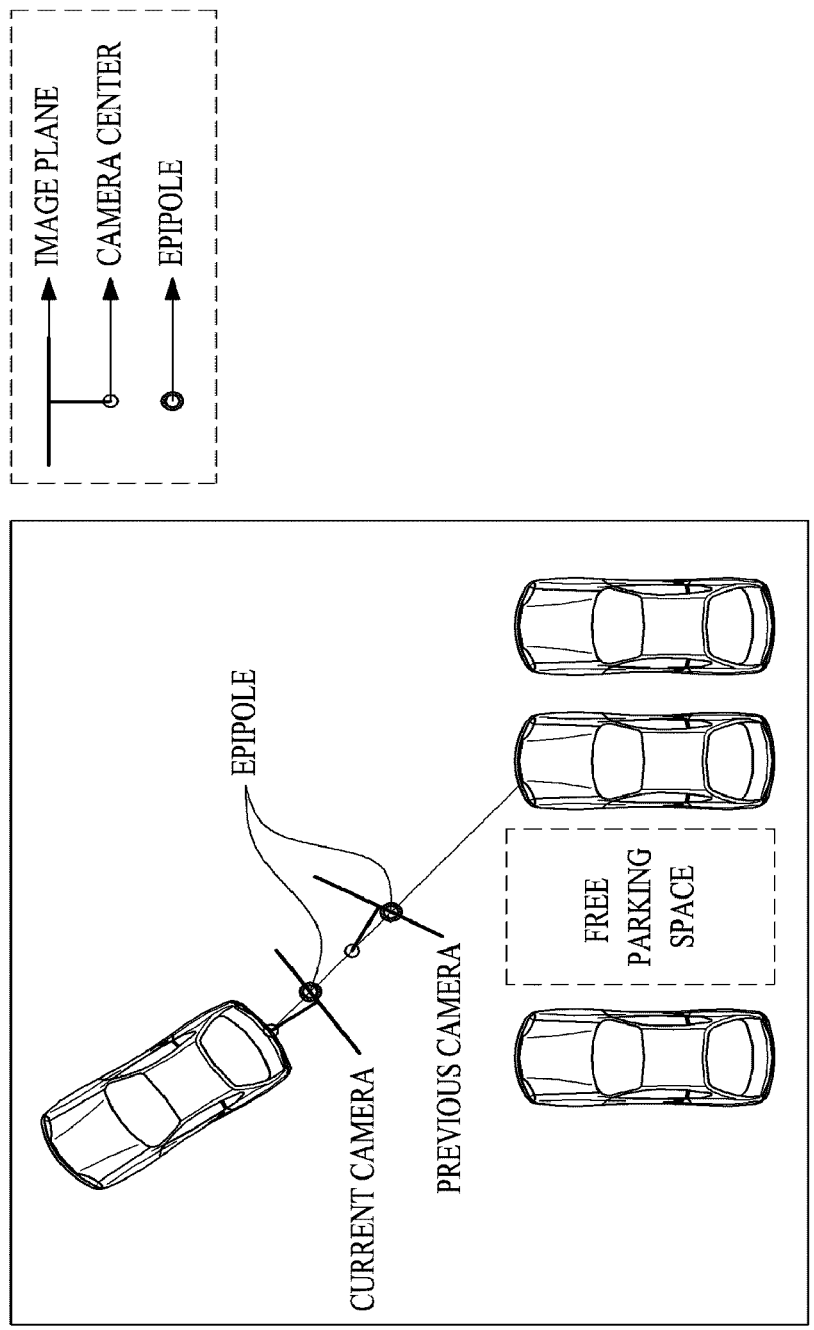
FIG. 3 is a drawing for showing an epipole location in a typical parking situation.

In the method of the present disclosure, the translation in the optical axis is quite dominant. So, the epipole is always located inside the image. Also, the epipole is usually located on an adjacent vehicle which is the present target object used for locating free parking spaces. FIG. 3 shows the epipole location in a typical parking situation. As shown in this figure, the epipole is usually located on the image of an adjacent vehicle due to the motion characteristics of the automobile rearview camera.

Figure 4A:
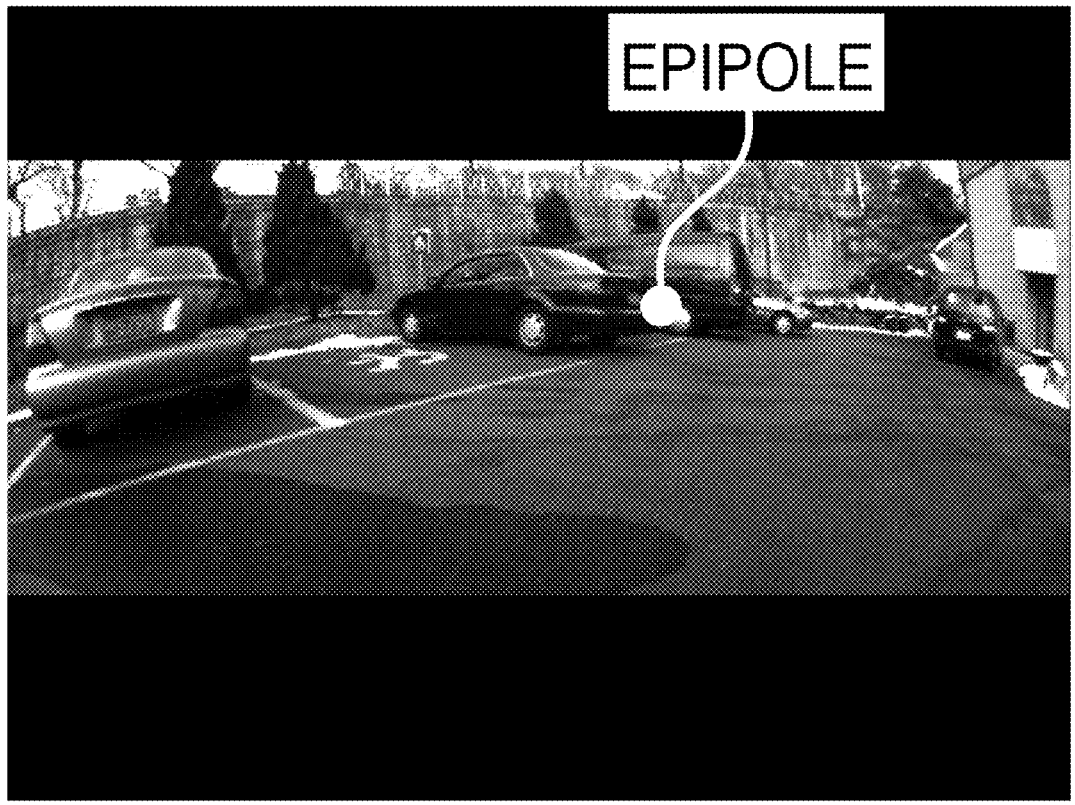
FIGS. 4A, B show the location of the epipole in the last frame of the image sequence and the reconstructed rearview structure.
Figure 4B:
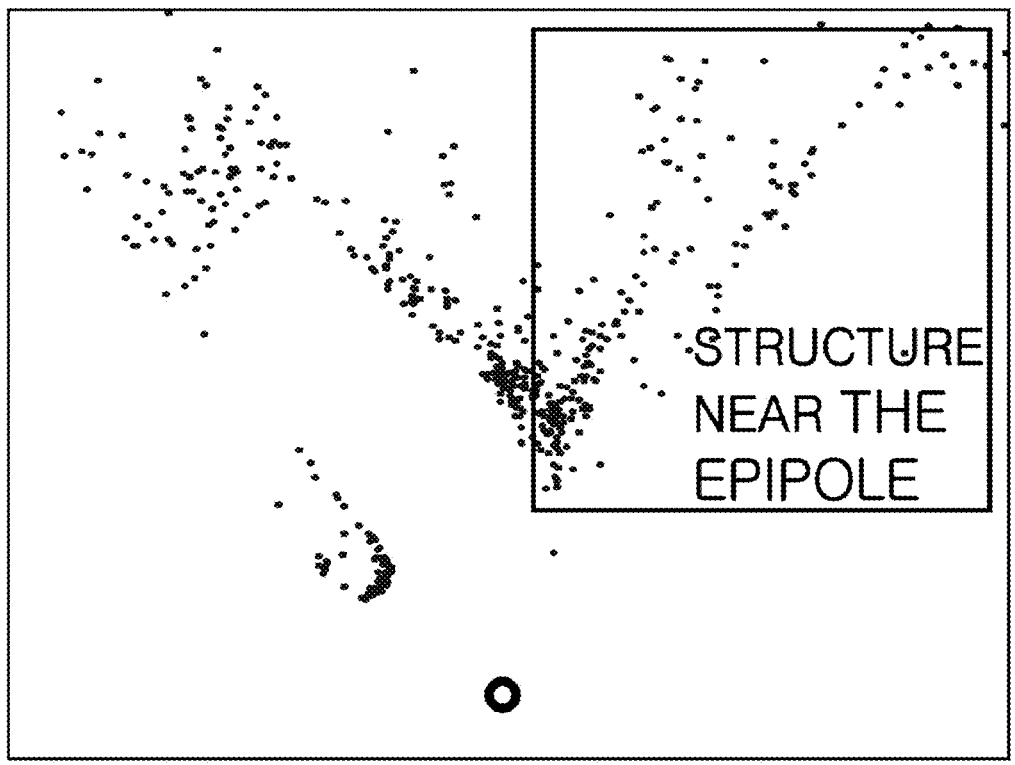

For this reason, the 3D structure of the adjacent vehicle is erroneously reconstructed in the present disclosure. FIGS. 4A, B show the location of the epipole in the last frame of the image sequence and the reconstructed rearview structure. The typical location of the epipole is depicted in FIG. 4A while FIG. 4B depicts the structure as seen from the top after removing the points near the ground plane. In FIG. 4A, the 3D points near the epipole on the adjacent vehicle appear quite erroneous, so the detection results are degraded. To solve this problem, de-rotation-based feature selection and 3D structure mosaicking are used.

2.2 De-Rotation-Based Feature Selection and 3D Structure Mosaicking

Figure 5A:
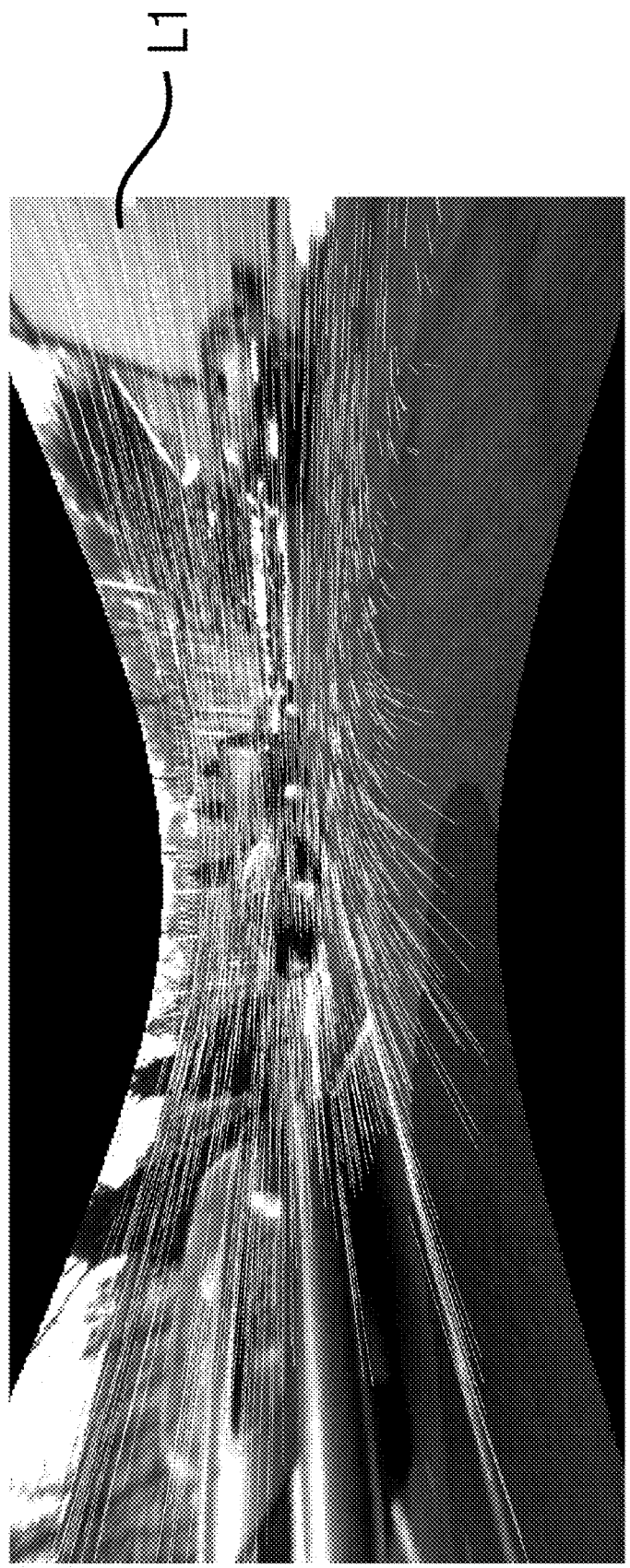
FIGS. 5A, B show de-rotation-based feature selection procedure.
Figure 5B:
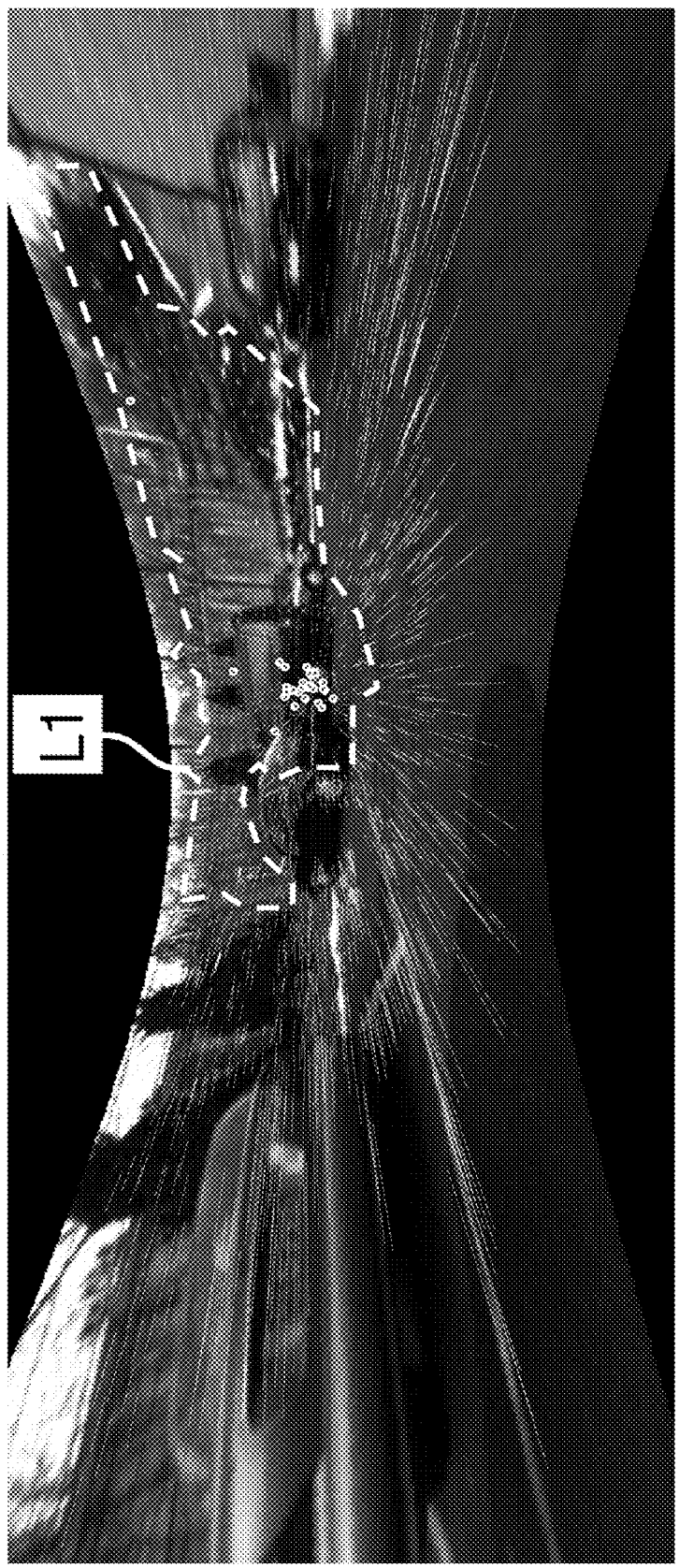

To solve the problem of the epipole and obtain a precise 3D rearview structure, the present disclosure uses a two-step method. In the first step, the rotational effect from the optical flow is eliminated and the translational effect is retained. Since the optical flow length in a pure translation is proportional to the 3D structure accuracy, the present disclosure simply throws away the point correspondences whose optical flow lengths are shorter than the threshold. This prevents the 3D structure from including erroneously reconstructed points. For eliminating the rotational effect of the optical flow, a conjugate rotation homography may be used. If x and x' were the images of a 3D point X before and after the pure rotation:

$$x = K[I|0]X$$

$$x' = K[R|0]X = KRK^{-1}x \quad (9)$$

so that $x'=Hx$ with $H=KRK^{-1}$. By using this homography, the present disclosure eliminates the rotational effect and relates the point correspondences by a pure translation. FIGS. 5A, B show the de-rotated-based feature selection procedure. Firstly, the point correspondences in the fisheye images are undistorted and transformed as shown in FIG. 5A. After that, the undistorted point correspondences are de-rotated by using a homography, as shown in FIG. 5B. All the lines joining the point correspondences point toward the epipole because the rotational effect is totally eliminated. In this case, the epipole is known as the focus of expansion. A thick spread L1 of lines indicate the unreliable point correspondences classified by the de-rotation based method. The unreliable point correspondences include the features near the epipole and far from the camera. The threshold for the optical flow length may be set to 10 pixels.

In the second step, the present disclosure reconstructs several 3D structures by using the selected point correspondences and mosaics them into one structure by estimating the similarity transformation. The similarity transformation parameters may be consisted of R (3×3 rotation matrix), t (3×1 translation vector), and c (scaling) and the least-square fitting method may be used with the 3D point correspondences known from the tracking results. Since the reconstructed 3D points may be erroneous and include outliers, the RANSAC approach is used for parameter estimation. The least-square fitting method can be explained as follows. There may be given two sets of point correspondences $X_i$ and $Y_i$; i=1, 2, . . . , n in the 3D space. $X_i$ and $Y_i$ may be considered as 3×1 column vectors, and n is equal to or larger than 3. The relationship between $X_i$ and $Y_i$ can be described as:

$$Y_i = cRX_i + t \quad (10)$$

The mean squared error of two sets of points can be written as:

$$e^2(R, t, c) = \frac{1}{n}\sum_{i=1}^{n} \|Y_i - (cRX_i + t)\|^2 \quad (11)$$

If A and B are the 3×n matrices of $\{X_1, X_2, \ldots, X_n\}$ and $\{Y_1, Y_2, \ldots, Y_n\}$, respectively, and if $UDV^T$ is an SVD of $AB^T$ ($UU^T=VV^T=I$, $D=\text{diag}(d_i)$, $d_1 \geq d_2 \geq \ldots \geq 0$), the transformation parameters which minimize the mean squared error can be calculated by:

$$R = UV^T, \quad (12)$$

$$c = \frac{1}{\sigma_X^2} \text{trace}(D),$$

$$t = \mu_Y - cR\mu_X$$

$\sigma^2_X$, $\mu^2_X$, and $\mu^2_Y$ can be defined as:

$$\sigma_X^2 = \frac{1}{n}\sum_{i=1}^{n} \|X_i - \mu_X\|^2, \quad (13)$$

$$\mu_X = \frac{1}{n}\sum_{i=1}^{n} X_i,$$

$$\mu_Y = \frac{1}{n}\sum_{i=1}^{n} Y_i$$

Figure 6A:
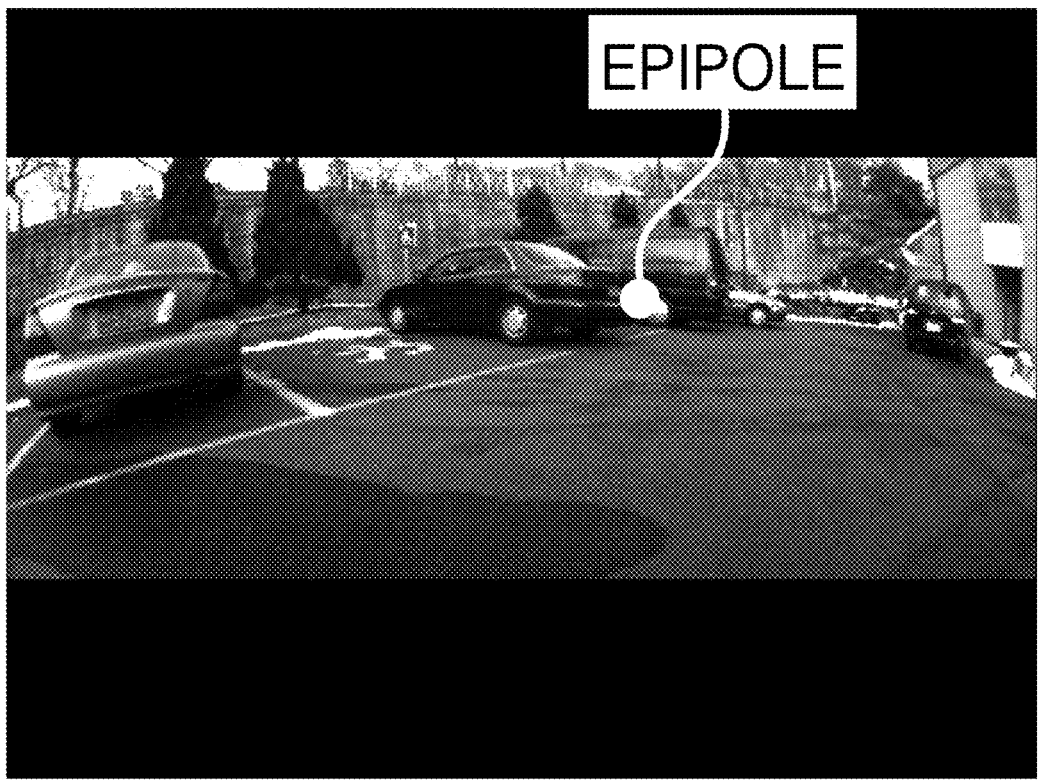
FIGS. 6Aa-6Ac, 6Ba-6Bc, 6Ca-6Cc show the reconstructed 3D structures with and without the proposed feature selection.
Figure 6A:
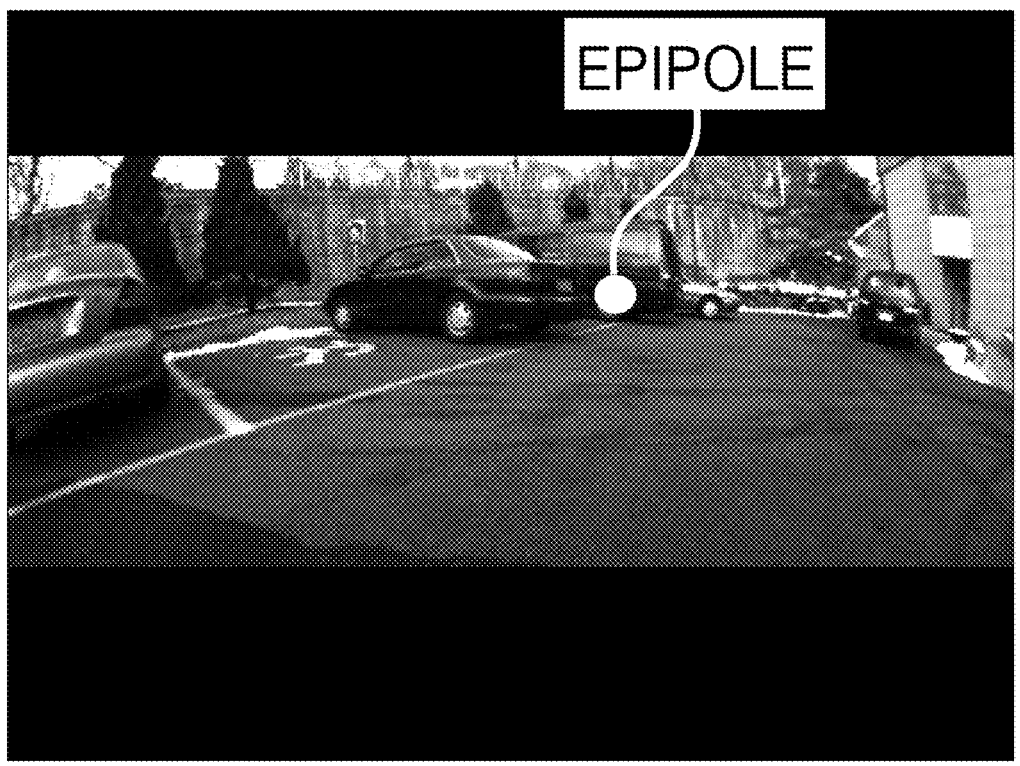
Figure 6A:
Figure 6B:
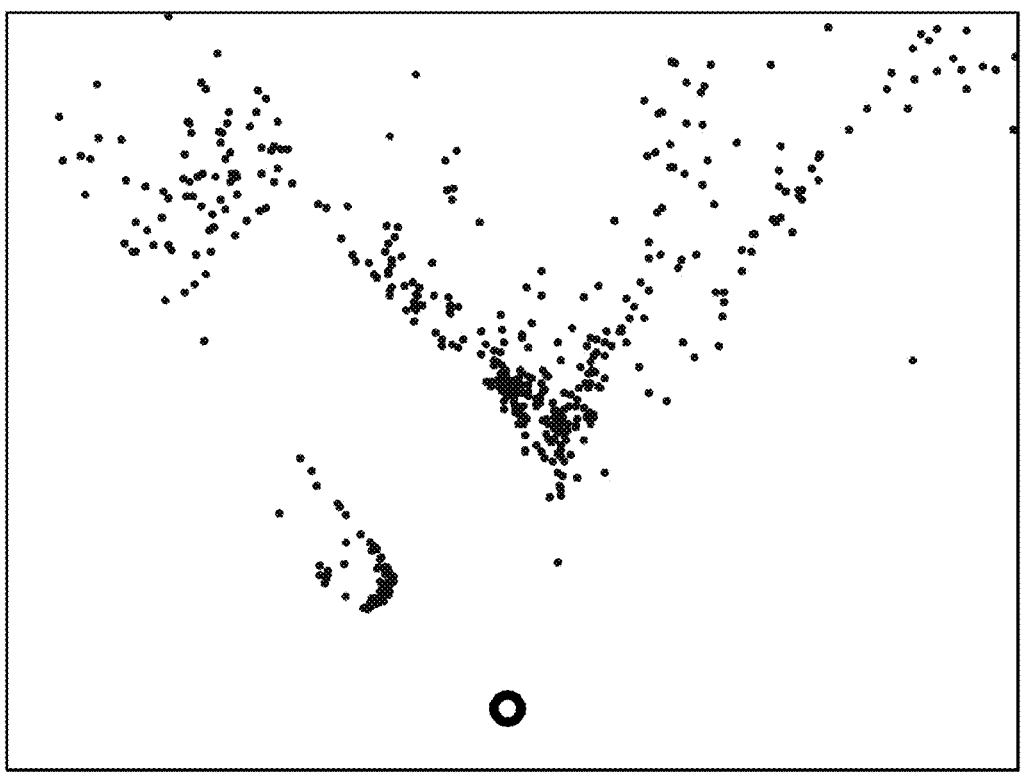
Figure 6B:
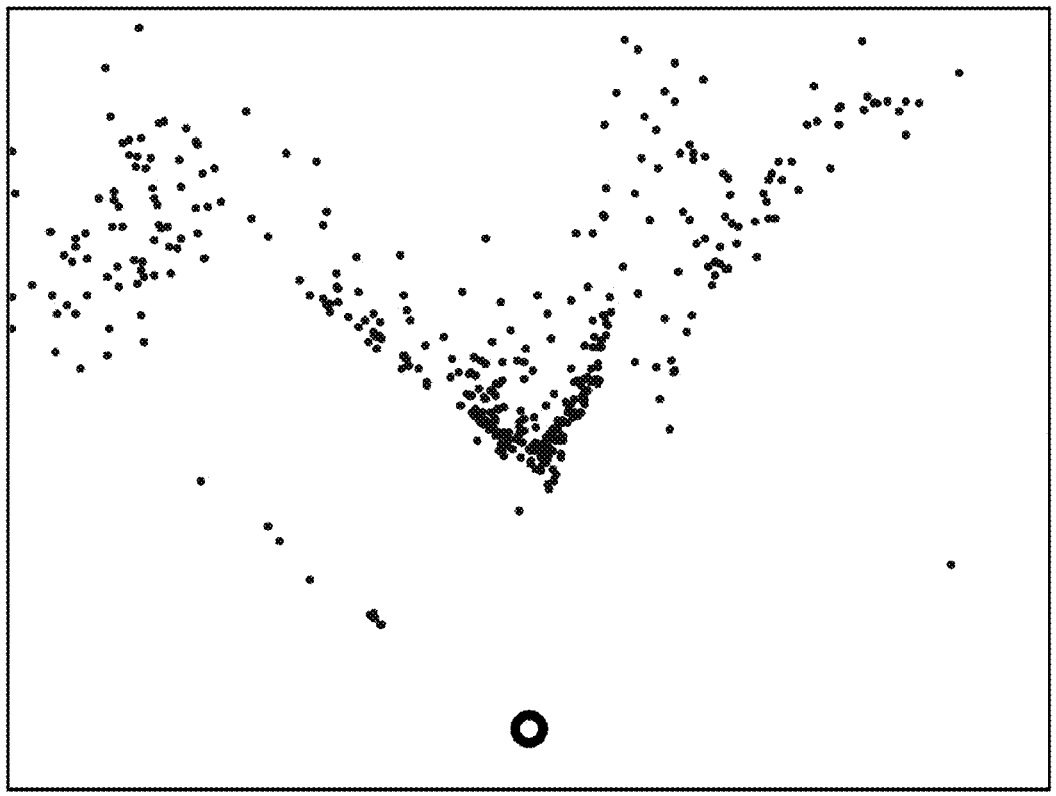
Figure 6B:
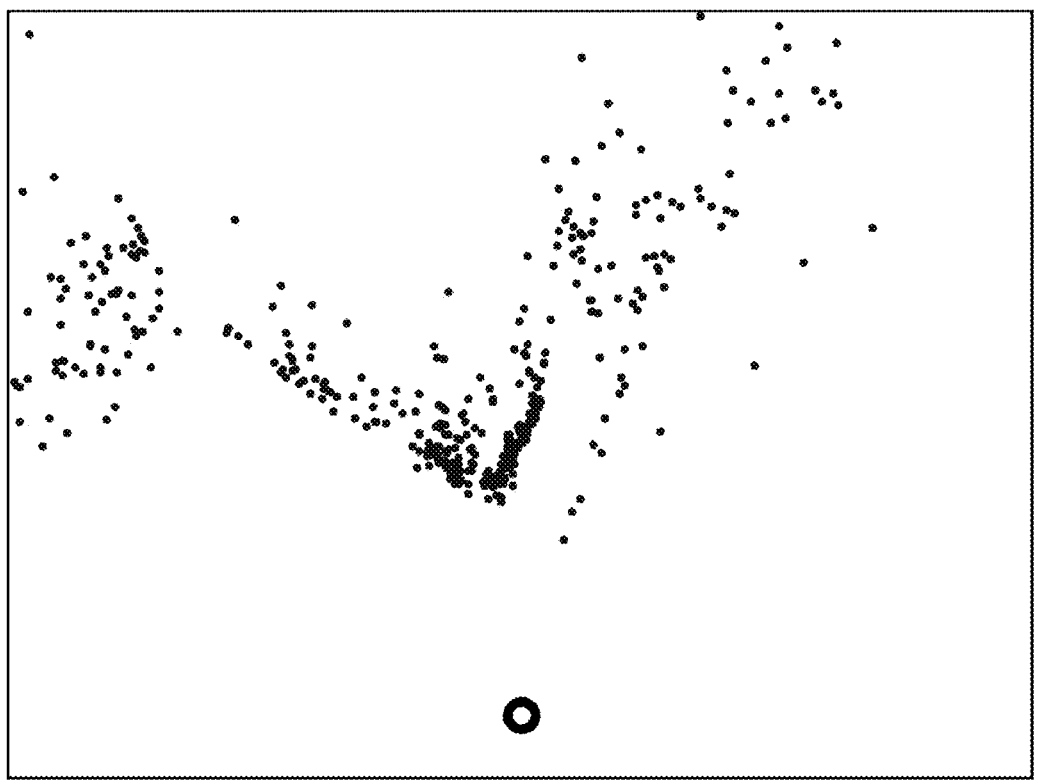
Figure 6C:
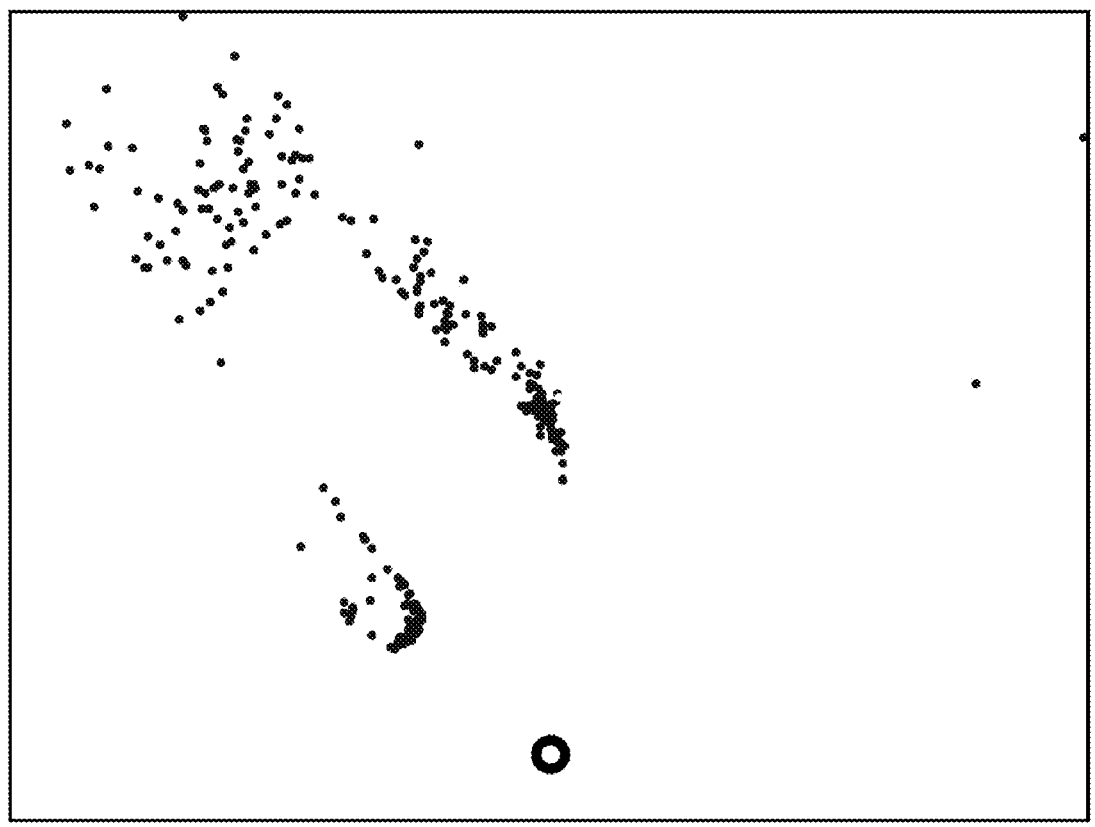
Figure 6C:
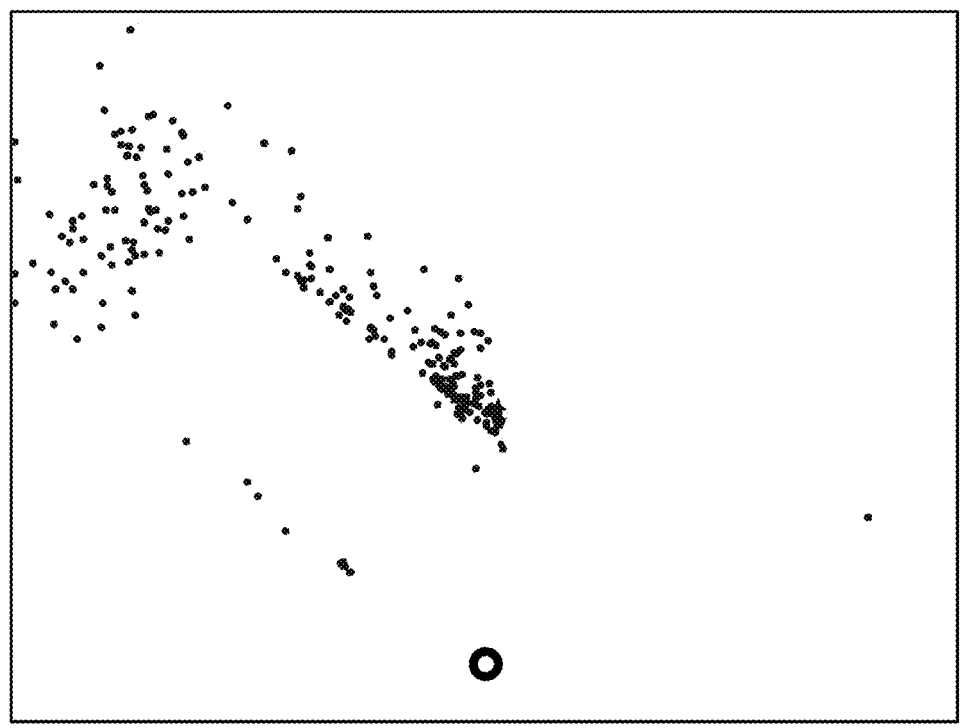
Figure 6C:
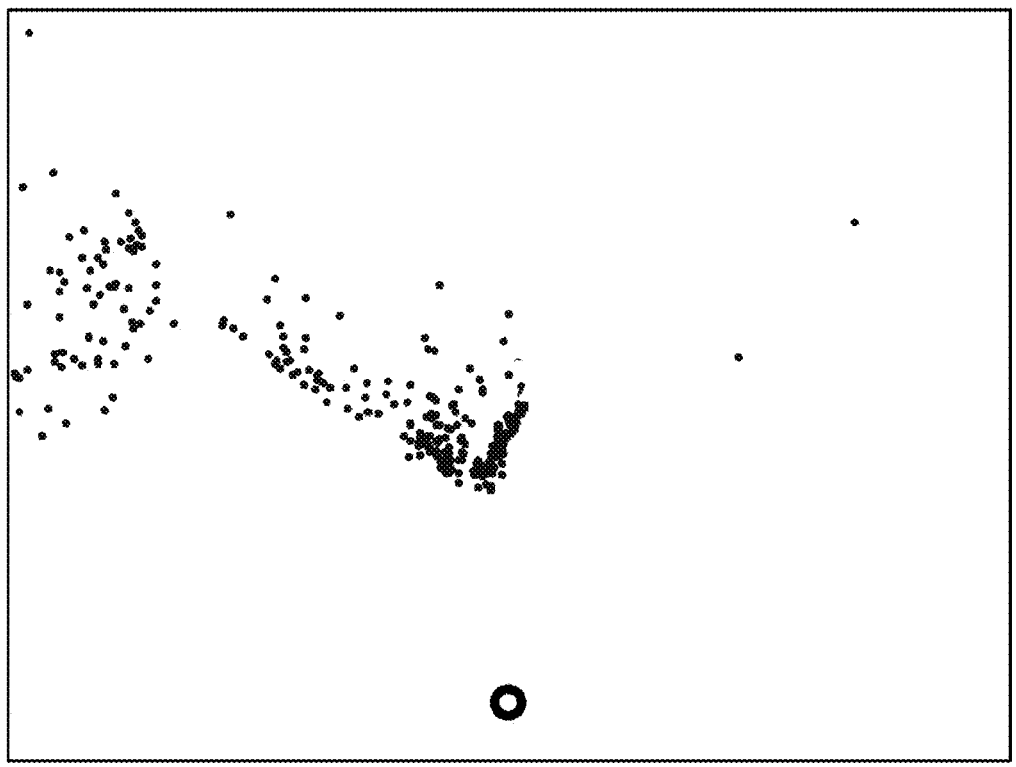

FIGS. 6A, B, C show the reconstructed 3D structures with and without the proposed feature selection and 3D mosaicking method. FIGS. 6Aa-6Ac shows the key frame images, FIGS. 6Ba-6Bc the reconstructed 3D structures without using the disclosed feature selection method and FIGS. 6Ca-6Cc the reconstructed 3D structures with using the feature selection method. The 3D structures are shown as seen from the top (after removing the points near the ground). FIGS. 6Aa-6Ac show the key frame images and their epipole locations. It can be seen that the epipoles are located on different positions of the adjacent vehicle. FIG. 4B shows the reconstructed 3D structures of each key frame. The structures near the epipoles are badly reconstructed. However, the erroneously reconstructed part in one structure is correctly reconstructed in another structure. FIG. 4C shows the reconstructed 3D structures of each key frame after removing the corresponding points by using the de-rotation-based method. Most of the erroneous 3D points in FIG. 4B are deleted.

Figure 7A:
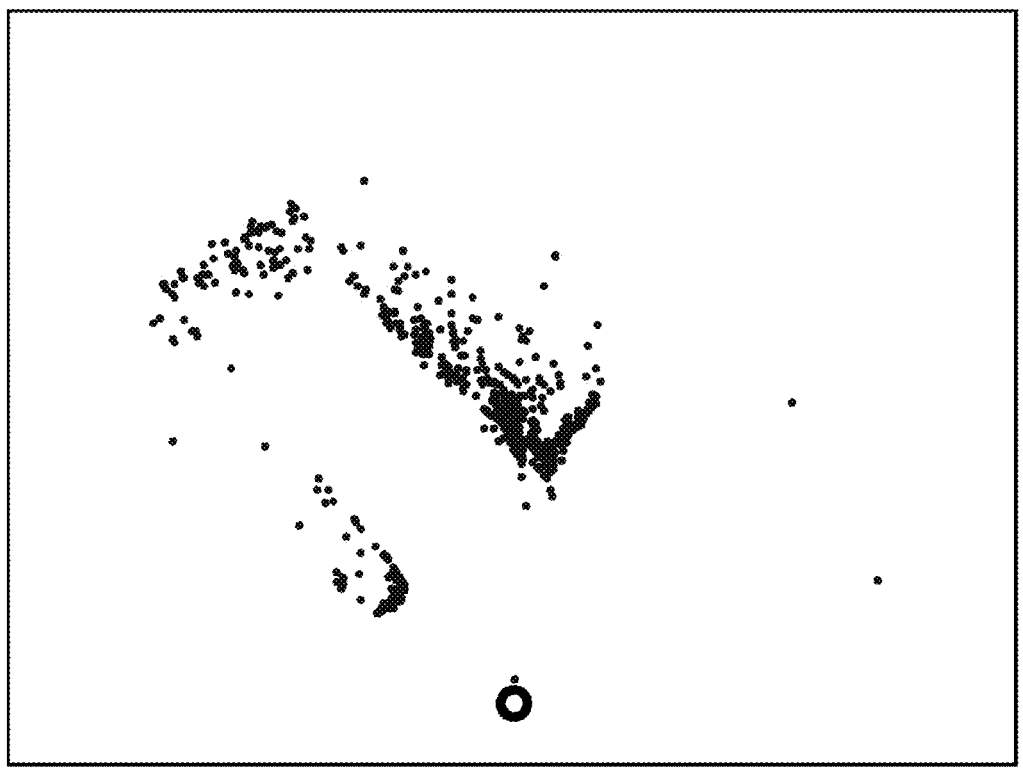
FIGS. 7A, B show the 3D structures when using and without using the feature selection and 3D mosaicking method, respectively.
Figure 7B:
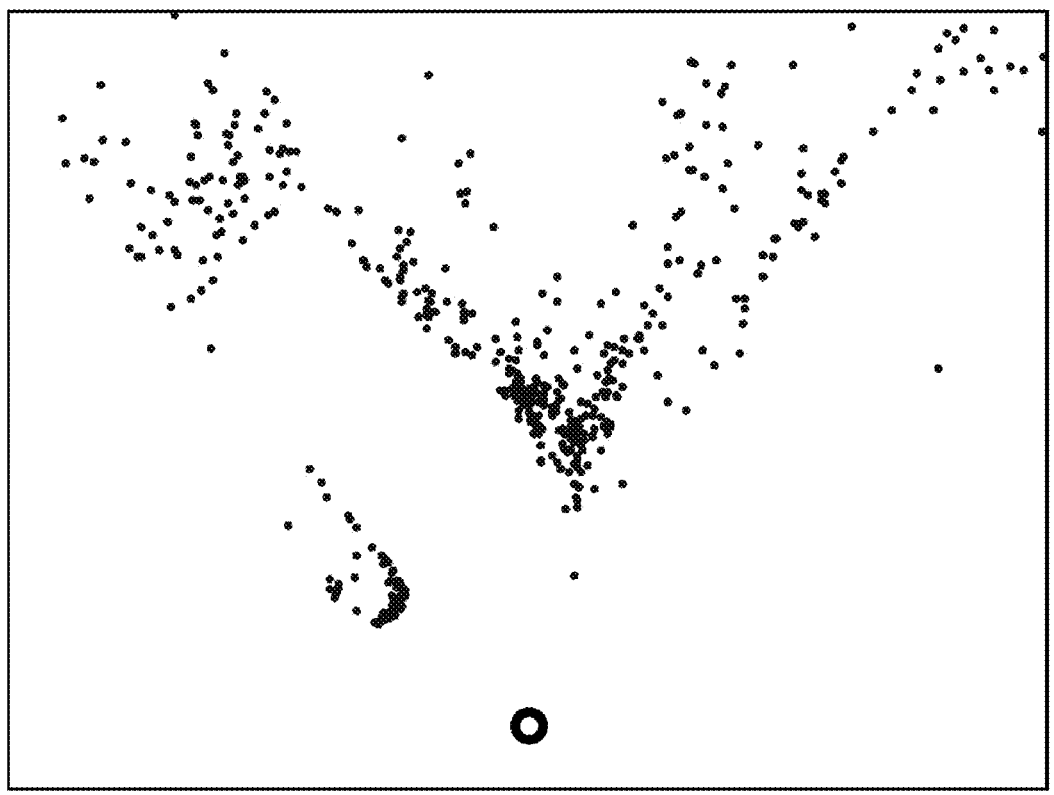

FIGS. 7A, B show the comparison of the 3D structures when using the proposed feature selection and 3D mosaicking method and without using the proposed method, respectively.

The point CC indicates the camera center. The degradation of the 3D structure near the epipole is solved by the present method.

3. Free Parking Space Detection 3.1 Metric Recovery by Using the Camera Height Ratio For locating free parking spaces in terms of centimeters, the metric information of the 3D structure has to be recovered. This is usually achieved by using a known baseline length or prior knowledge of the 3D structure. Since the camera height in the real world is known in the present disclosure, estimation may be made on the camera height in the reconstructed world and the ratio of the estimated camera height to the real height is used for metric recovery. The camera height in the real world may be assumed as fixed in this disclosure. The height sensor can be used with camera height variations that may occur due to changing cargos or passengers.

Figure 8:
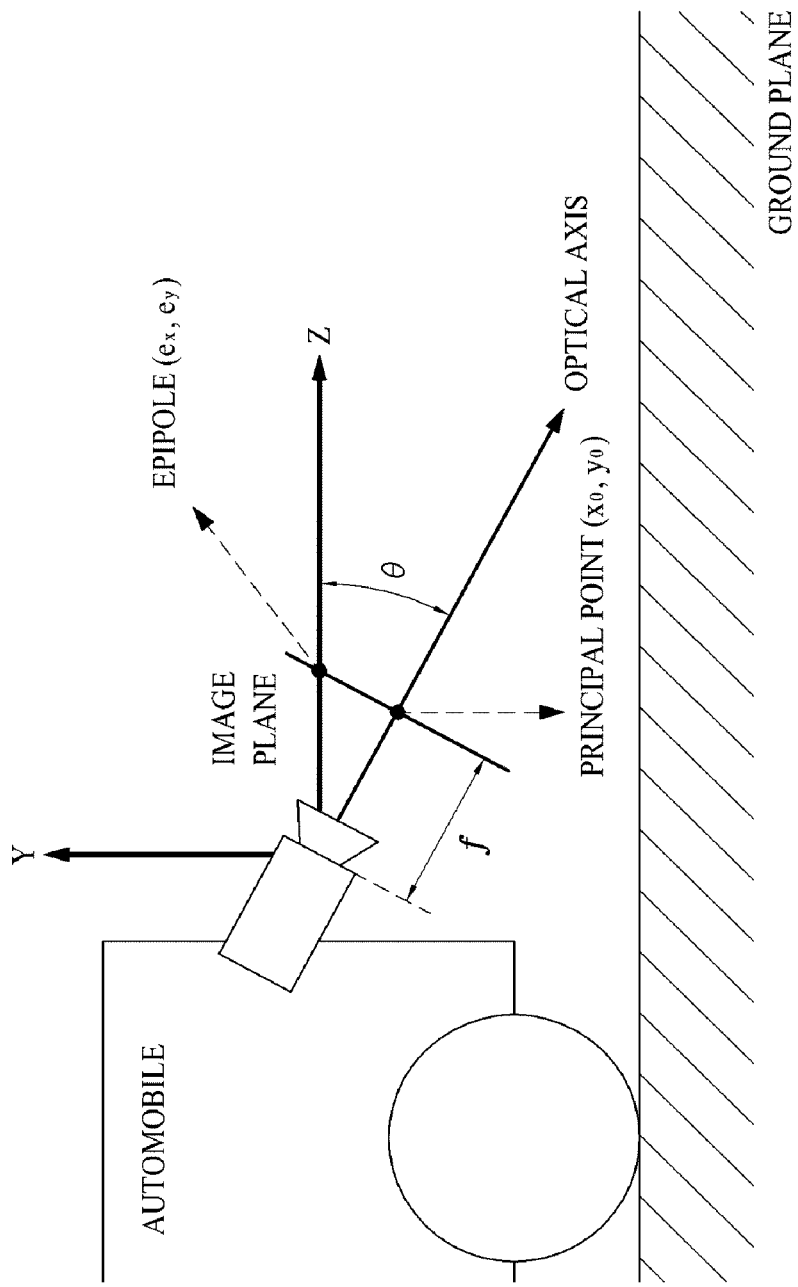
FIG. 8 is a schematic diagram showing a configuration of rearview camera.

To calculate the camera height ratio, the ground plane in the reconstructed world has to be estimated because the camera location is set to the origin. The estimation procedure may consist of three steps: tilting angle compensation, density estimation-based ground plane detection, and 3D plane estimation-based ground plane refinement. The tilting angle is calculated and the 3D structure is rotated according to this calculation. This procedure forces the ground plane to be parallel to the XZ-plane. FIG. 8 shows a configuration of the rearview camera. In the camera configuration of FIGS. 6A, B, C, the tilting angle (θ) may be calculated by using Eq. (14):

$$\theta = \arctan\left(\frac{e_x - y_0}{f}\right) \quad (14)$$

$e_x$ and $y_0$ are the y-axis coordinates of the epipole and the principal point, respectively. f is the focal length of the camera.

Figure 9:
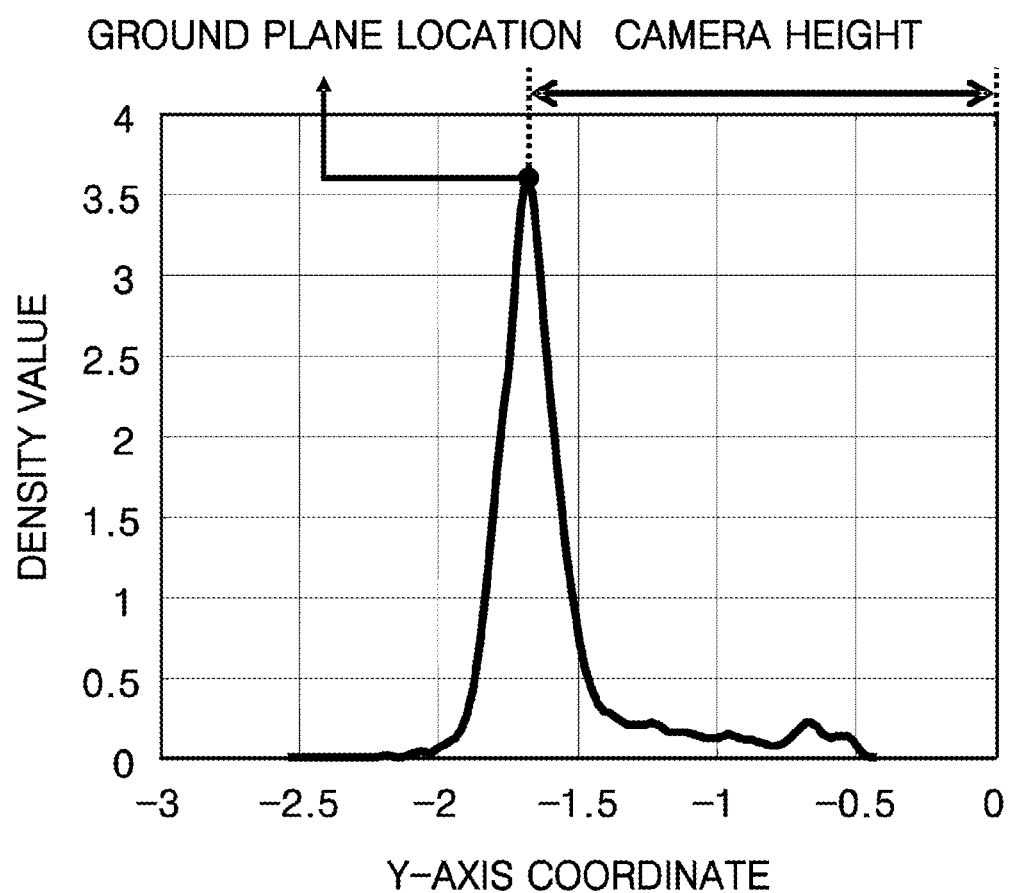
FIG. 9 is a graph showing a density of the Y-axis coordinate of the 3D points.

The ground plane may be roughly detected by using the density of the 3D points in the Y-axis. Since there is usually only one plane (the ground plane) parallel to the XZ-plane, the density of the Y-axis coordinate of the 3D points is at the maximum peak at the location of the ground plane. FIG. 9 shows the density of the Y-axis coordinate of the 3D points. In this figure, the peak location is recognized as the location of the ground plane and the distance from the peak location to the origin is recognized as the camera height in the 3D structure.

Figure 10A:
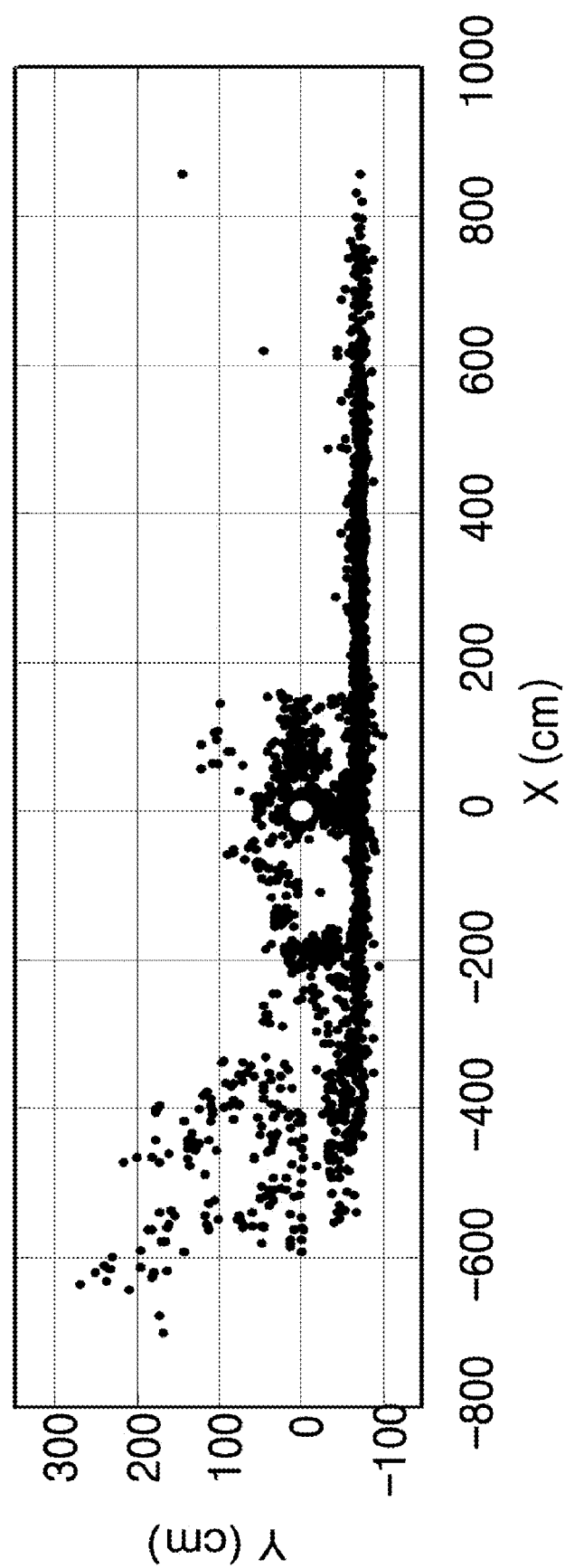
FIGS. 10A, B show the result of metric recovery in camera-view and top-view, respectively.
Figure 10B:
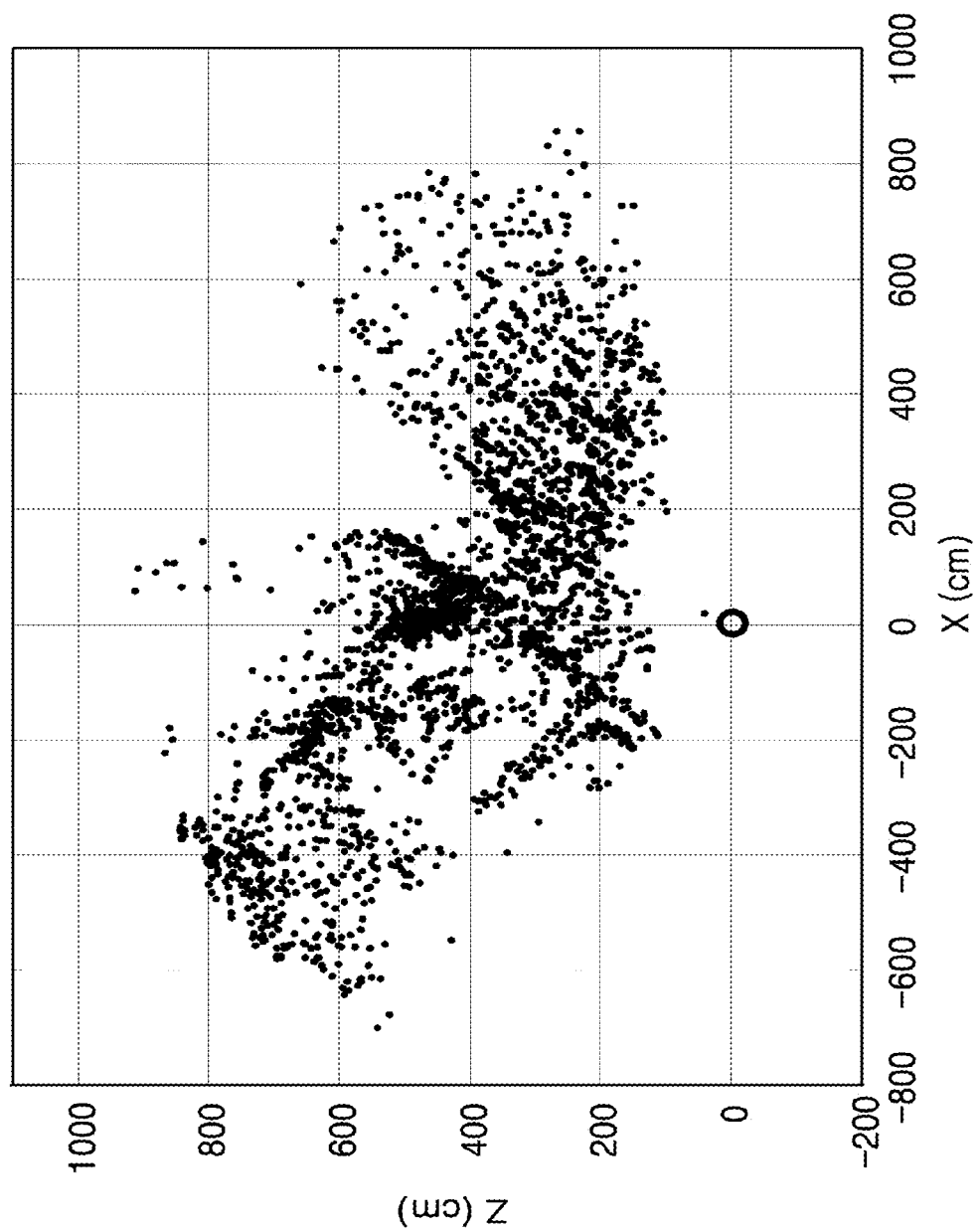

In the experiments, the correct location and the orientation of the ground plane were refined by 3D plane estimation. The 3D points near the roughly estimated ground plane were selected and the RANSAC approach was used for estimating the 3D plane. The camera height was refined by calculating the perpendicular distance between the camera center and the ground plane. The 3D structure was scaled in centimeters by using the camera height ratio. After that, the 3D points far from the camera center were deleted and the remaining points were rotated according to the 3D plane orientation to make the ground plane parallel to the XZ-plane. FIGS. 10A, B show the final result of the metric recovery. FIG. 8A represents the resultant metric recovery viewed from the camera and FIG. 8B is the metric recovery viewed from the top, respectively, where the point at (0, 0, 0) indicates the camera center.

3.2. Free Parking Space Detection

Figure 11A:
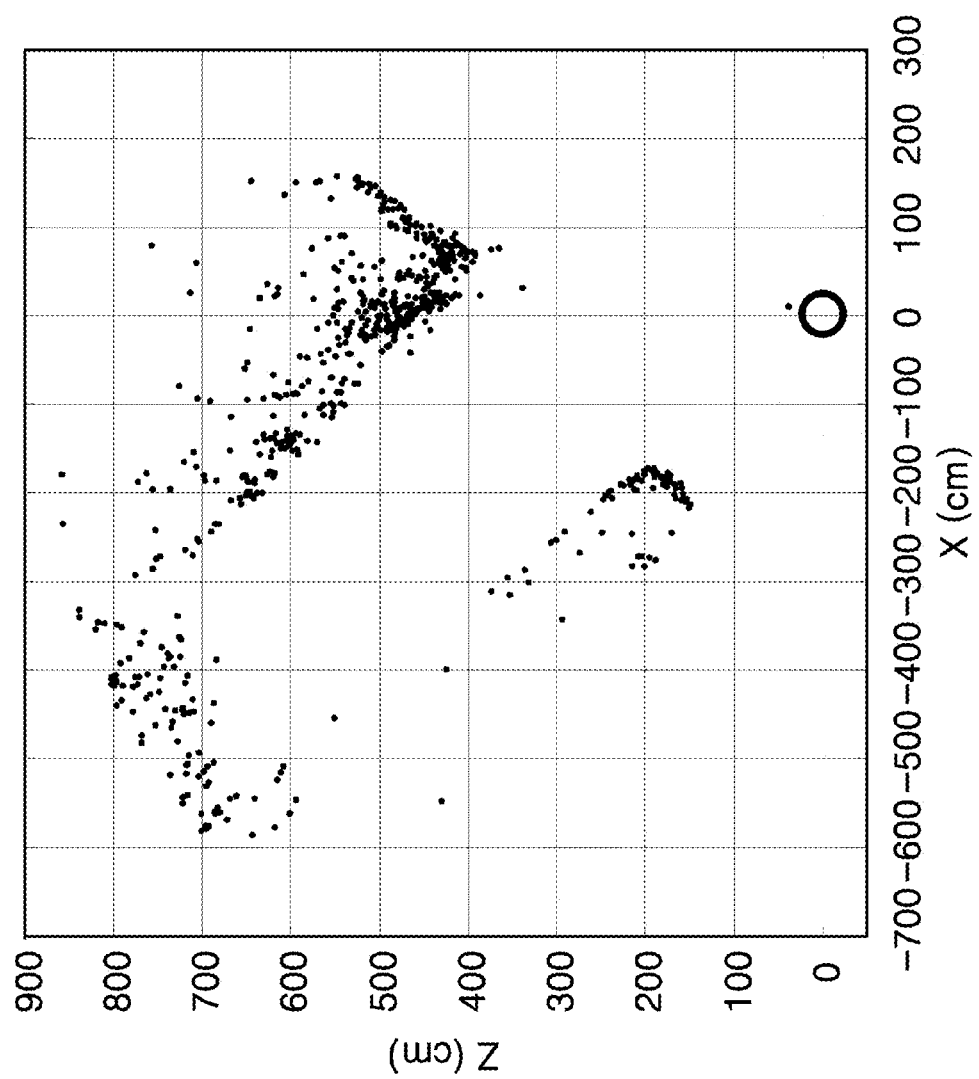
FIGS. 11A, B show the dimension reduction result and the isolated point deletion result, respectively.
Figure 11B:
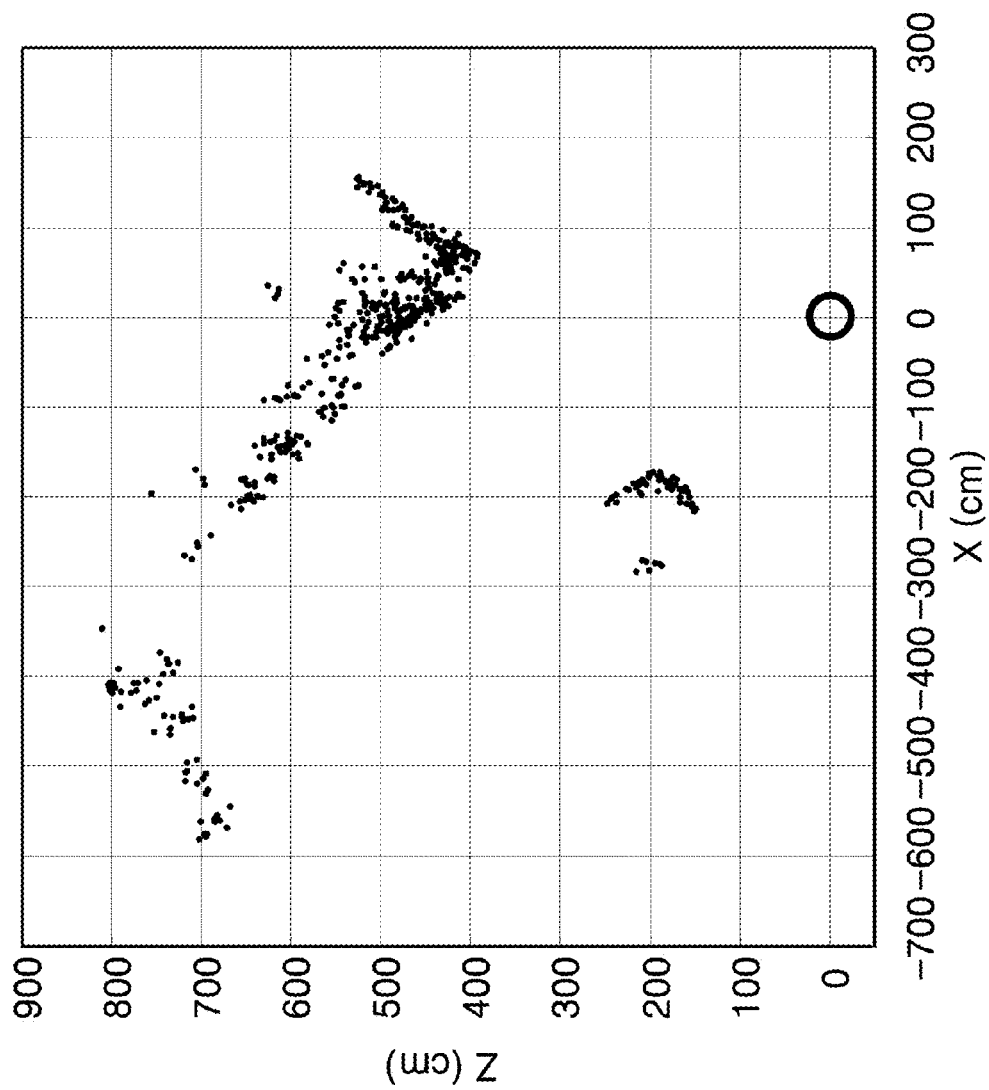

Once the Euclidean 3D structure of the rearview is reconstructed, free parking spaces have to be detected in the 3D point clouds. For this task, estimation may be made on the position of the adjacent vehicles and free parking spaces may be located accordingly. Because position estimation can be complicated and time-consuming, the present disclosure reduces the dimensions of the structure from 3D to 2D by using the top-view. The 3D points, whose heights from the ground plane are between 30~160 cm, may be selected and the height information may be removed to reduce the dimensions. FIGS. 11A, B show the dimension reduction result where FIG. 11A is the dimension reduction result and FIG. 11B is the isolated point deletion result. As illustrated, in the dimension reduction result the outlines of the adjacent vehicle and other obstacles can be seen. In this figure, there are some isolated points which might have been caused by the 3D reconstruction error, so they are deleted by counting the number of neighbors defined as:

$$N(x,\epsilon) = \{y | \|y-x\| \leq \epsilon\} \quad (15)$$

x and y represent the 2D points and $\epsilon$ represents the radius. If $N(x,\epsilon)$ were lower than the threshold, x is defined as an isolated point and deleted. FIG. 11B shows the isolated point deletion result with $\epsilon$ and the threshold set as 10 cm and 3, respectively. The point at (0, 0) indicates the camera center.

Since all the points in FIGS. 11A, B do not belong to the outermost surface of the automobile, the outline points are selected by using the relationship between the incoming angle and the distance from the camera center. This procedure is performed for better estimation of the position of the adjacent vehicle. The incoming angle is the angle between the horizontal axis and the line joining the camera center and a 2-D point.

Figure 12A:
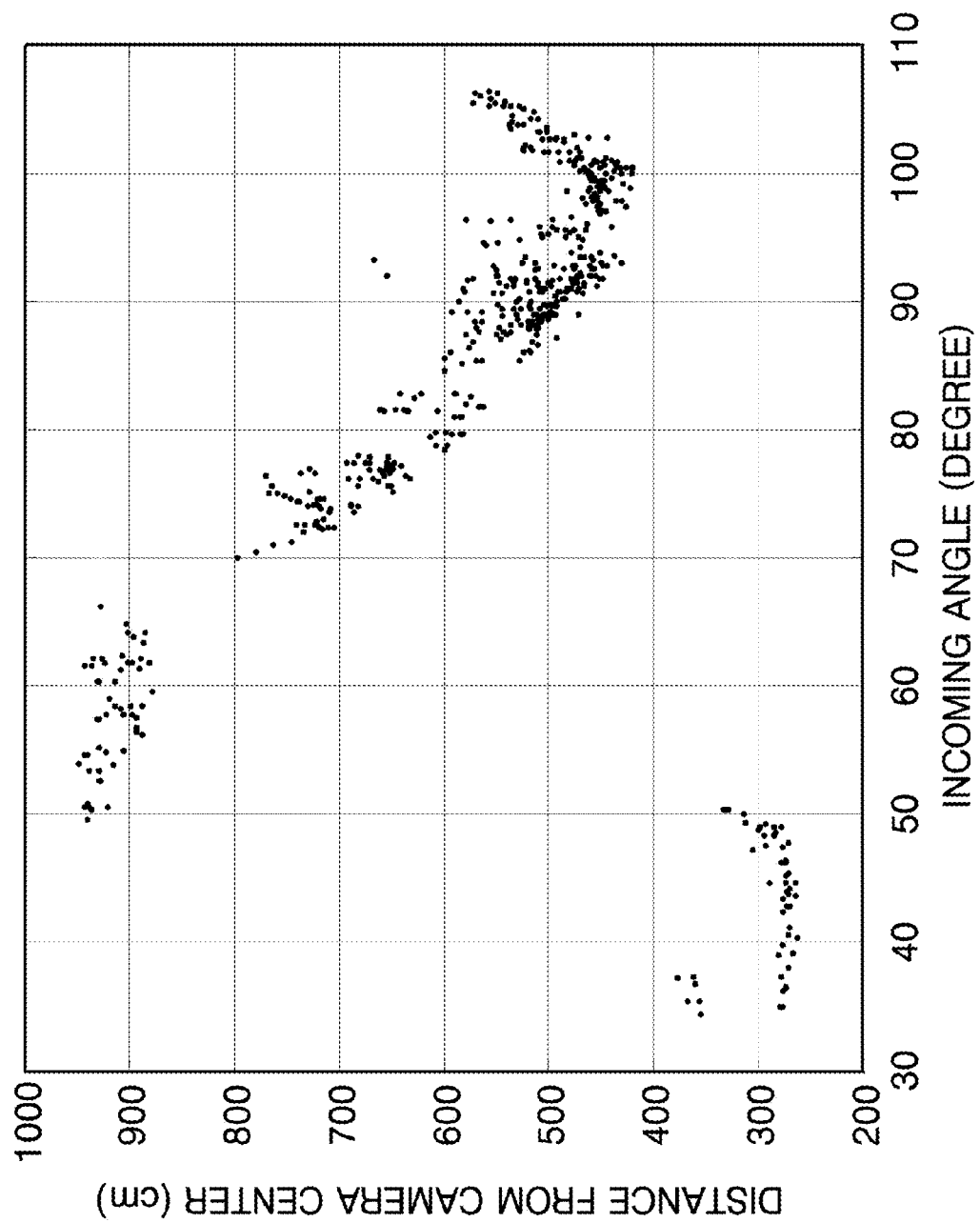
FIGS. 12A, B show the outline point selection.
Figure 12B:
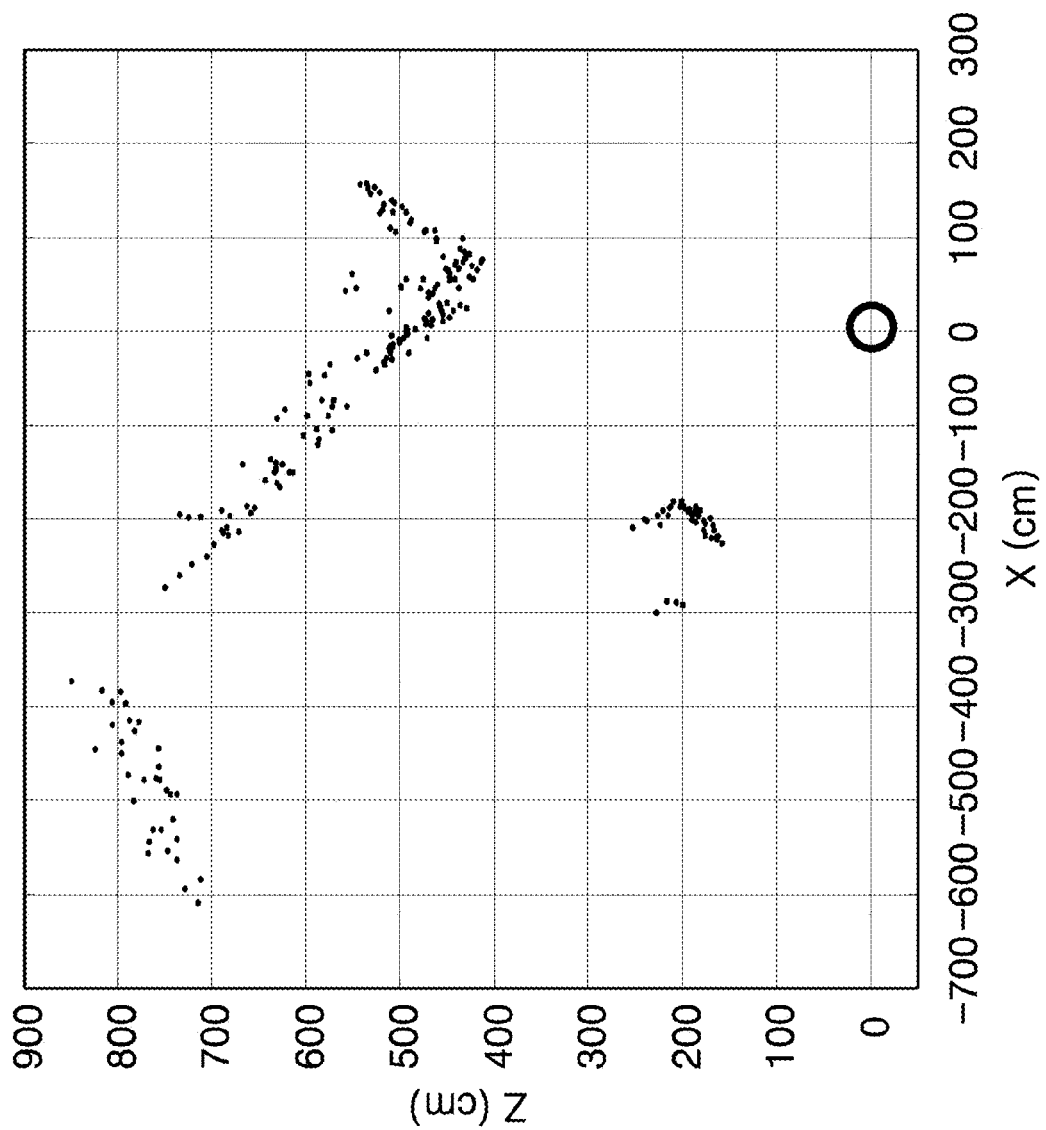

FIGS. 12A, B show the outline point selection where FIG. 12A re-depicts 2D points with the incoming angle and the distance from the camera center and FIG. 12B is the result of the outline point selection. FIG. 11B may be re-depicted in FIG. 12A by using the incoming angle and the distance from the camera center. Since the points on the same vertical line may come from the same incoming angle in FIG. 12A, the nearest point from the camera center among the points on the same vertical line may be recognized as the outline point.

If the automobile shape is a rectangle as seen from the top, the position of the adjacent vehicle can be represented by a corner point and orientation. Therefore, the corner point and orientation of the adjacent vehicle are estimated and these values may be used to locate free parking spaces. Since the reconstructed structure is noisy and includes not only adjacent vehicles but also other obstacles, it is preferable to use a projection-based method. This method rotates the 2D points and projects them onto the X-axis and Z-axes. It discovers the rotation angle which maximizes the sum of the maximum peak values of the two projection results. The rotation angle and the locations of the two maximum peak values are recognized as the orientation and the corner point, respectively. This method estimates the orientation and the corner point at the same time and it is robust to noisy data.

However, when using this method, it is impossible to know whether the estimated orientation is longitudinal or lateral. To determine this, it is assumed that a driver would turn right when a free parking space is on the left, and vice versa. Using this assumption, it is possible to determine whether the estimated orientation is longitudinal or lateral. The turning direction of the automobile may be estimated from the rotation matrix extracted from the fundamental matrix.

After estimating the orientation and corner point, the points in the longitudinal direction of the adjacent vehicle may be selected and used for refining the orientation by using RANSAC-based line estimation. This procedure is needed because the lateral side of automobiles is usually curved so the longitudinal side gives more precise orientation information. The corner point is also refined according to the refined orientation.

Figure 13A:
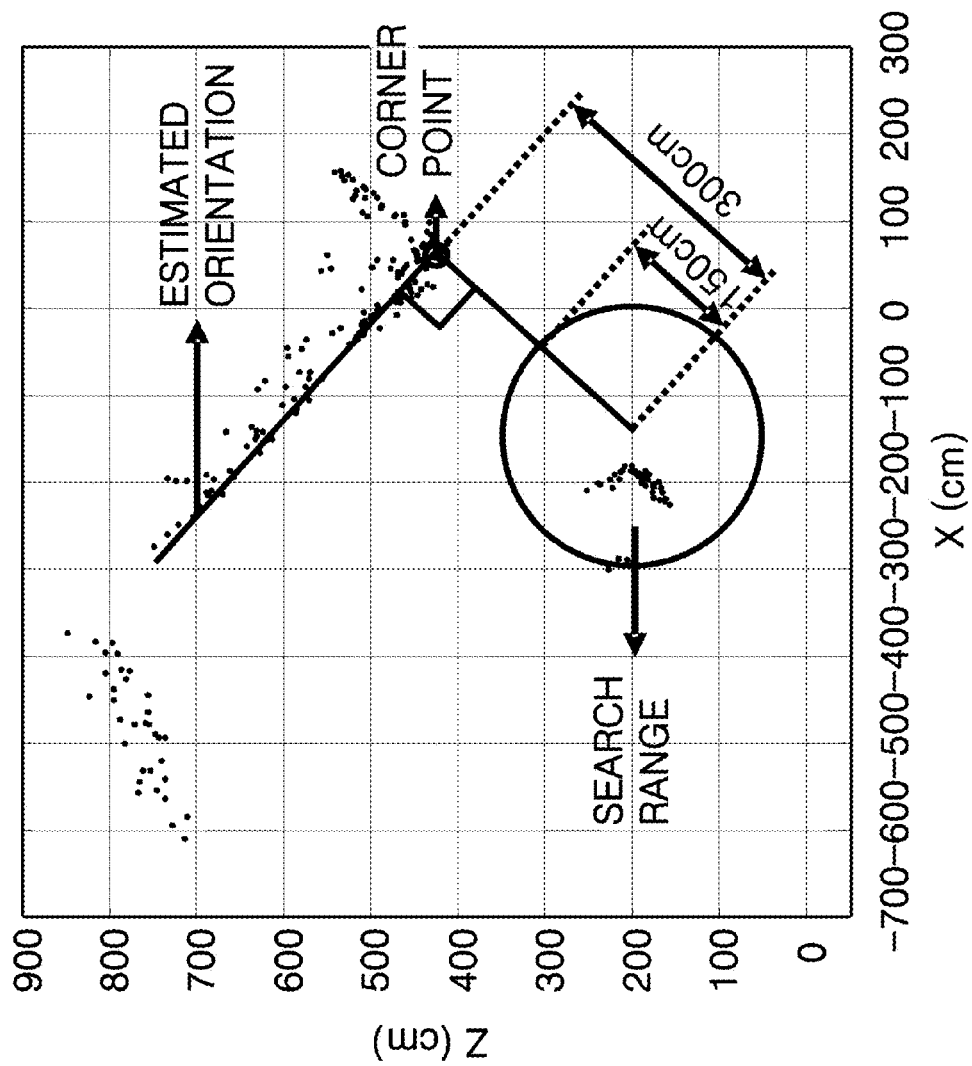
FIGS. 13A, B show a search range of the other adjacent vehicle and free parking space localization.
Figure 13B:
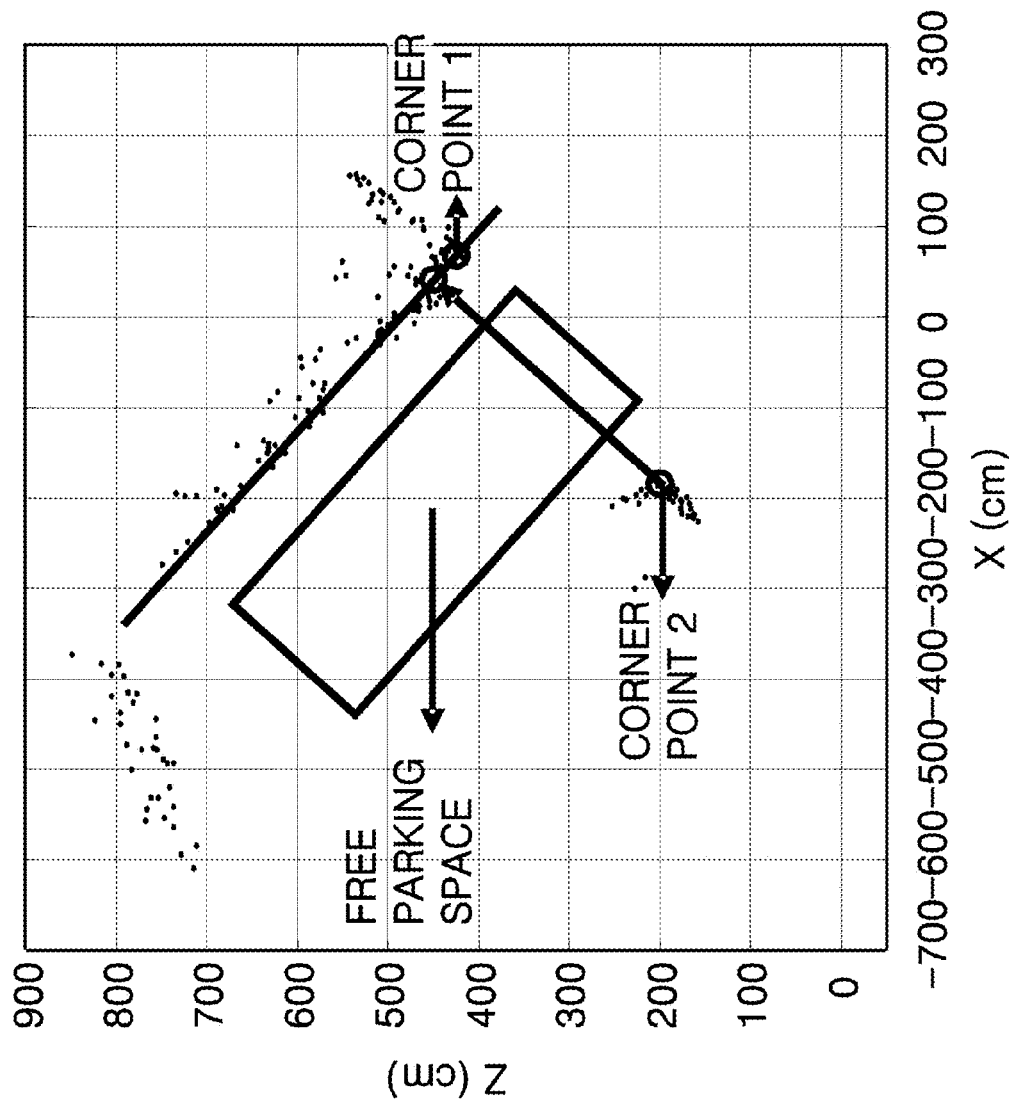

FIG. 13A shows a search range of the other adjacent vehicle and FIG. 13B shows a free parking space localization. To locate the most appropriate free parking spaces, other adjacent vehicles located opposite the estimated vehicle are also searched. The search range may be set as FIG. 13A by using the estimated corner point and orientation. A circle having a radius of 150 cm may be set with its center being located 300 cm away from the corner point in the orthogonal direction of the orientation.

Figure 14:
FIG. 14 shows the final result of free parking space detection depicted on the last frame of the image sequence.

If there were point clouds inside the search range, the other vehicle is considered to be found and the free parking space is located in the middle of two vehicles in the lateral direction. The corner points of two adjacent vehicles are projected in a longitudinal direction and the outer one may be used to locate free parking spaces. This is described in FIG. 13B. In this figure, corner point 1 is selected because this is the outer one. If the other vehicle (corner point 2) were not found, the free parking space is located beside the detected vehicle with a 50 cm interval in the lateral direction. FIG. 14 shows the final result of the free parking detection process depicted on the last image sequence. The width and length of the free parking space in FIG. 14 are set as 180 cm and 480 cm, respectively.

4. Experimental Results

The free parking space detection system was tested in 154 different parking situations. From the database, 53 sequences were taken with the laser scanner data and 101 sequences were taken without it to analyze the results in terms of success rate and detection accuracy.

4.1 Comparison of the Reconstructed Rearview Structures

Figure 15:
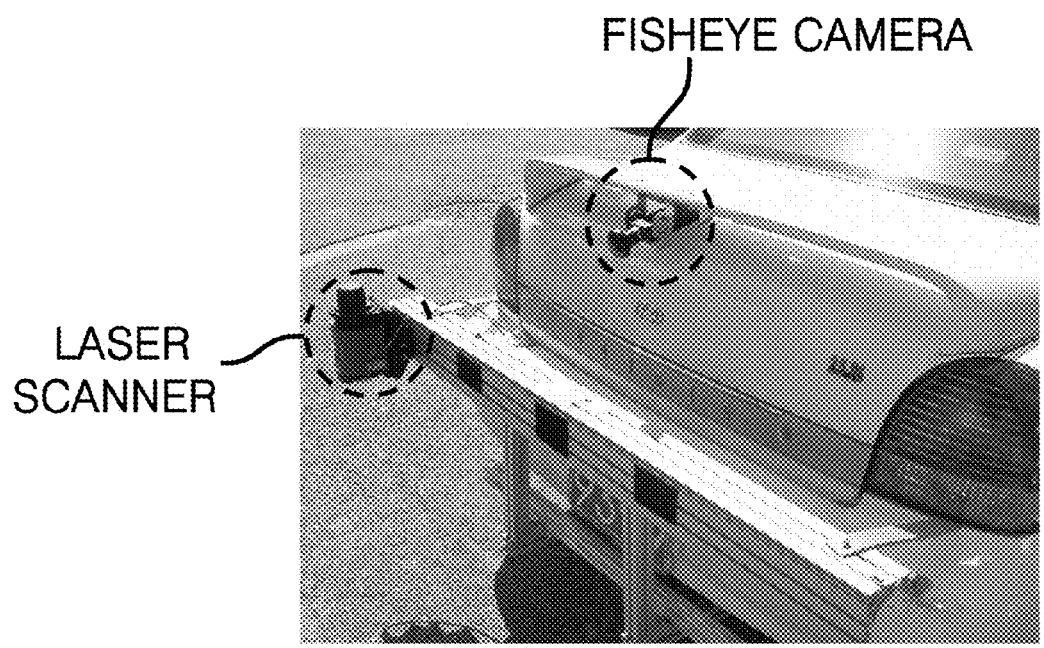
FIG. 15 is a photograph of a fisheye camera and laser scanner mounted on the automobile.

This experiment reconstructed the 3D rearview structures when using and without using the disclosed feature selection and 3D mosaicking method and compared them to the laser scanner data. The angular resolution and depth resolution of the laser scanner used were 0.125° and 3.9 mm, respectively and the systematic error was ±25 mm. FIG. 15 shows the fisheye camera and the laser scanner mounted on the automobile. These two sensors were pre-calibrated.

Figure 16A:
FIGS. 16Aa-16Ab, 16Ba-16Bb, 16Ca-16Cb show comparison of the reconstructed rearview structures when using and without using the proposed method.
Figure 16A:

FIGS. 16A, B, C show comparisons of the reconstructed rearview structures when using and without using the disclosed method. FIGS. 16Aa-16Ab depict the last frames of two image sequences, FIGS. 16Ba-16Bb the rearview structures reconstructed when using the disclosed method, and FIGS. 16Ca-16Cb the rearview structures reconstructed without using the disclosed method.

Figure 16B:
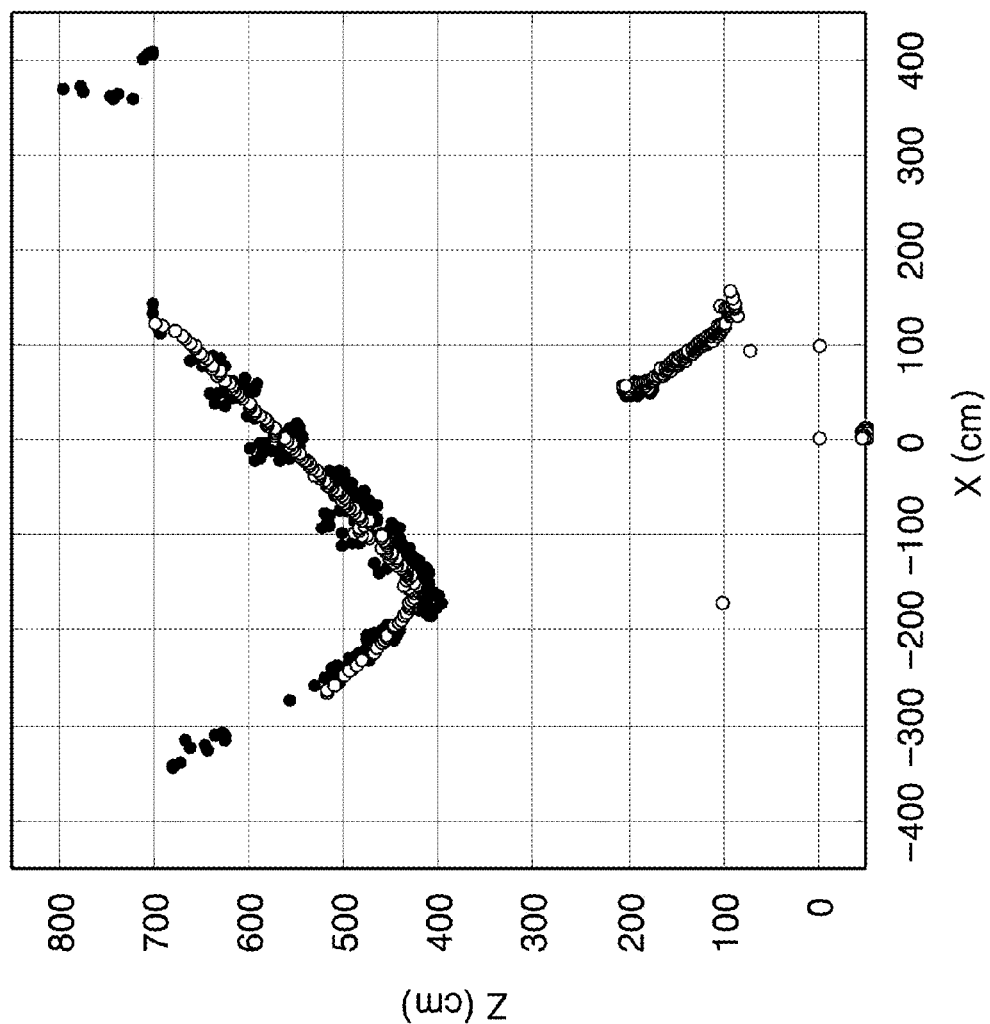
Figure 16B:
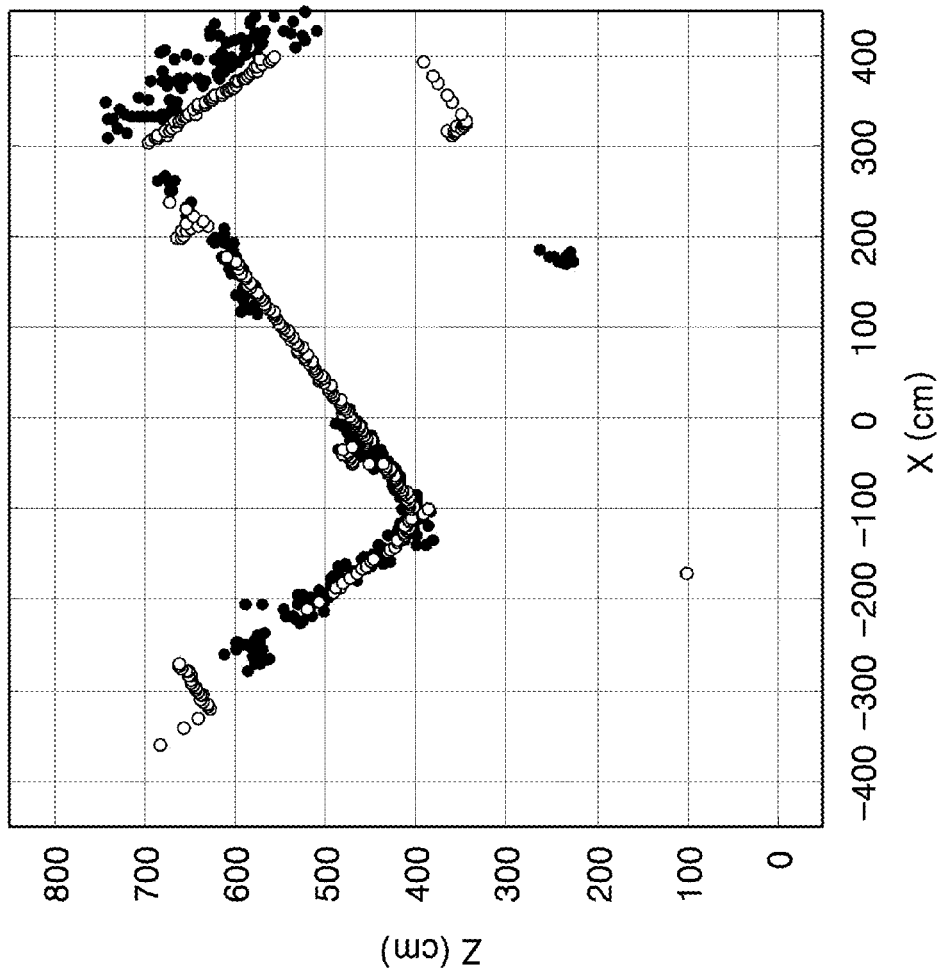

The reconstructed structures are depicted as seen from the top after removing the points near the ground plane. The points on the vehicle indicate the locations of the epipoles. In FIGS. 16Ba-16Bb, 16Ca-16Cb, the points in solid and outlined areas indicate the reconstructed points and the laser scanner data, respectively.

Figure 16C:
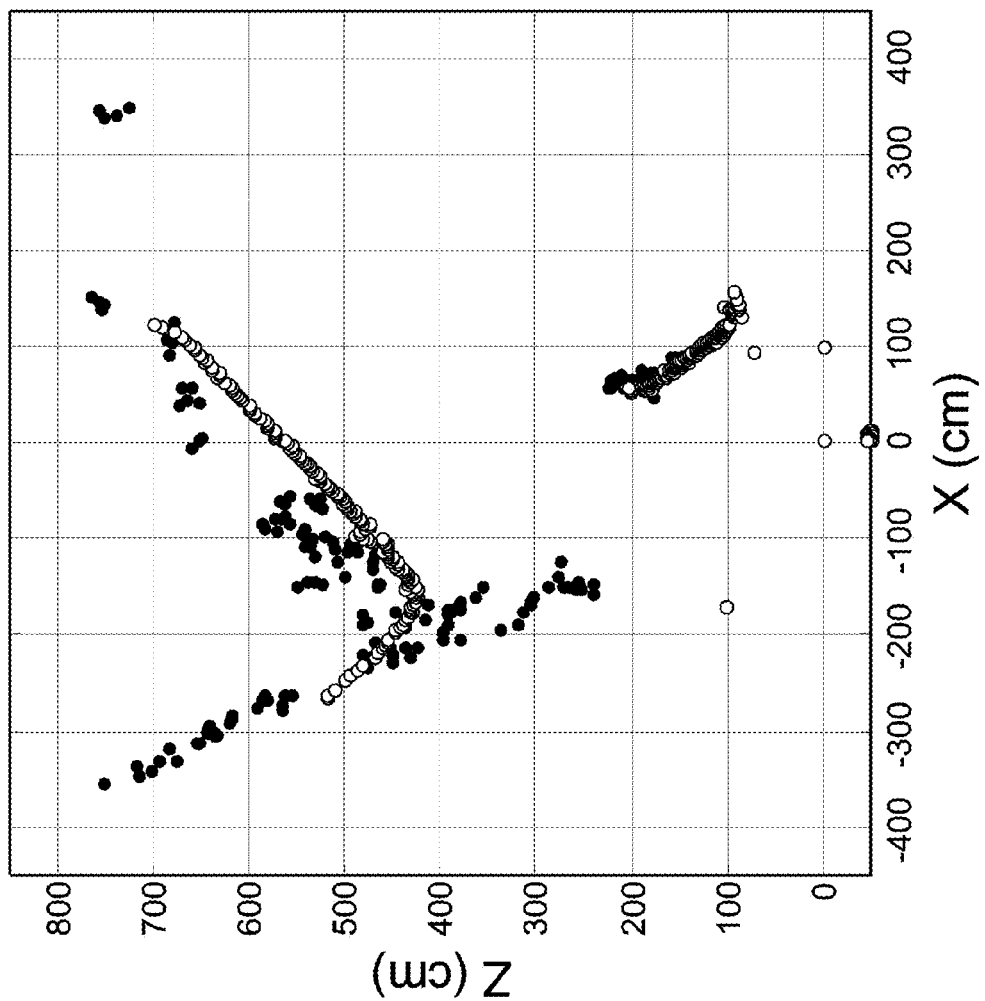
Figure 16C:
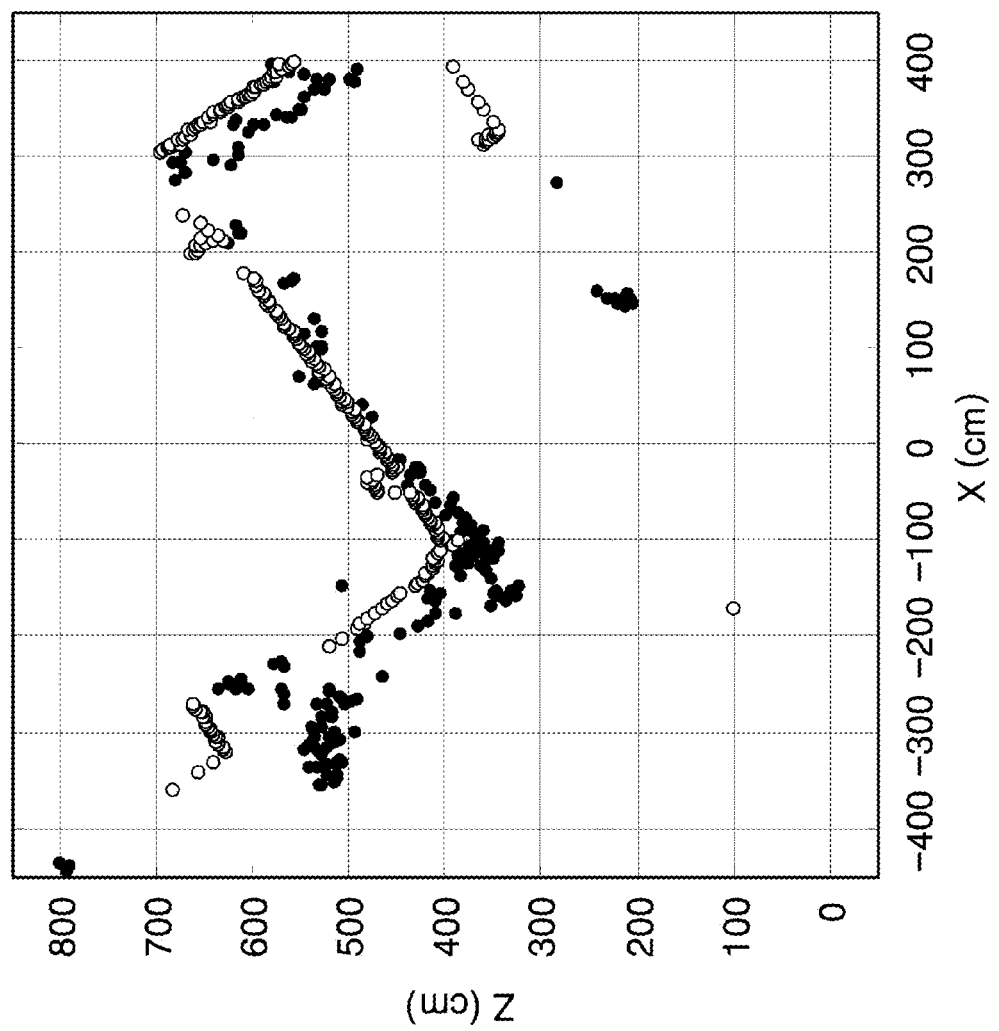

By using this comparison, it is possible to obtain three advantages of the disclosed method. First, it reduces the number of erroneously reconstructed points. FIGS. 16Ca-16Cb show more erroneous points outside the ground truth data than FIGS. 16Ba-16Bb because the disclosed method removes the point correspondences near the epipole and far from the camera center. Second, the present disclosure increases the amount of information about adjacent vehicles. The structure in FIGS. 16Ba-16Bb is more detailed than that in FIGS. 16Ca-16Cb because the density of the points on the adjacent vehicle is increased by the mosaicking 3D structures. Last, the present disclosure enhances metric recovery results. In FIGS. 16Ca-16Cb, the scale of the reconstructed structure differs from the ground truth, since the disclosed method produces more points on the ground plane, so it makes the ground plane estimation more accurate.

4.2 Free Parking Space Detection Results

Figure 17A:
FIGS. 17Aa-17Ac, 17Ba-17Bc, 17Ca-17Cc, 17Da-17Dc show six successful detections.
Figure 17A:
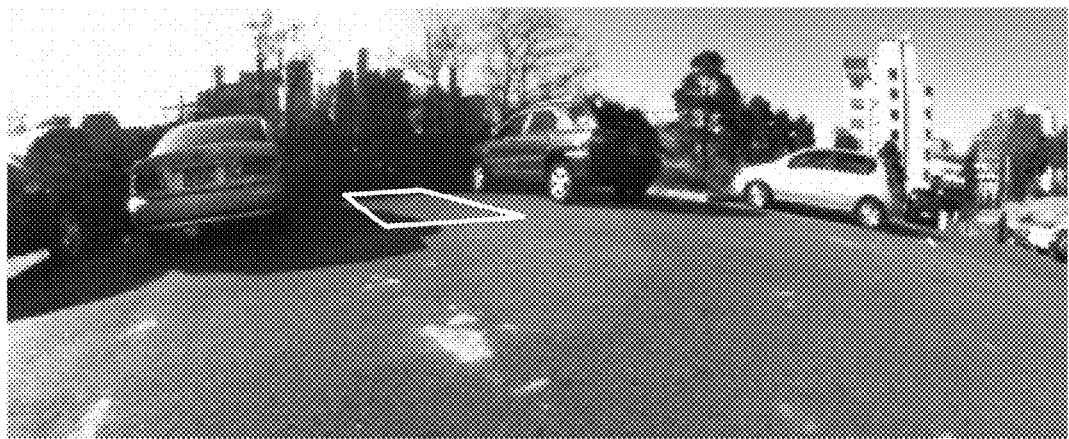
Figure 17A:
Figure 17B:
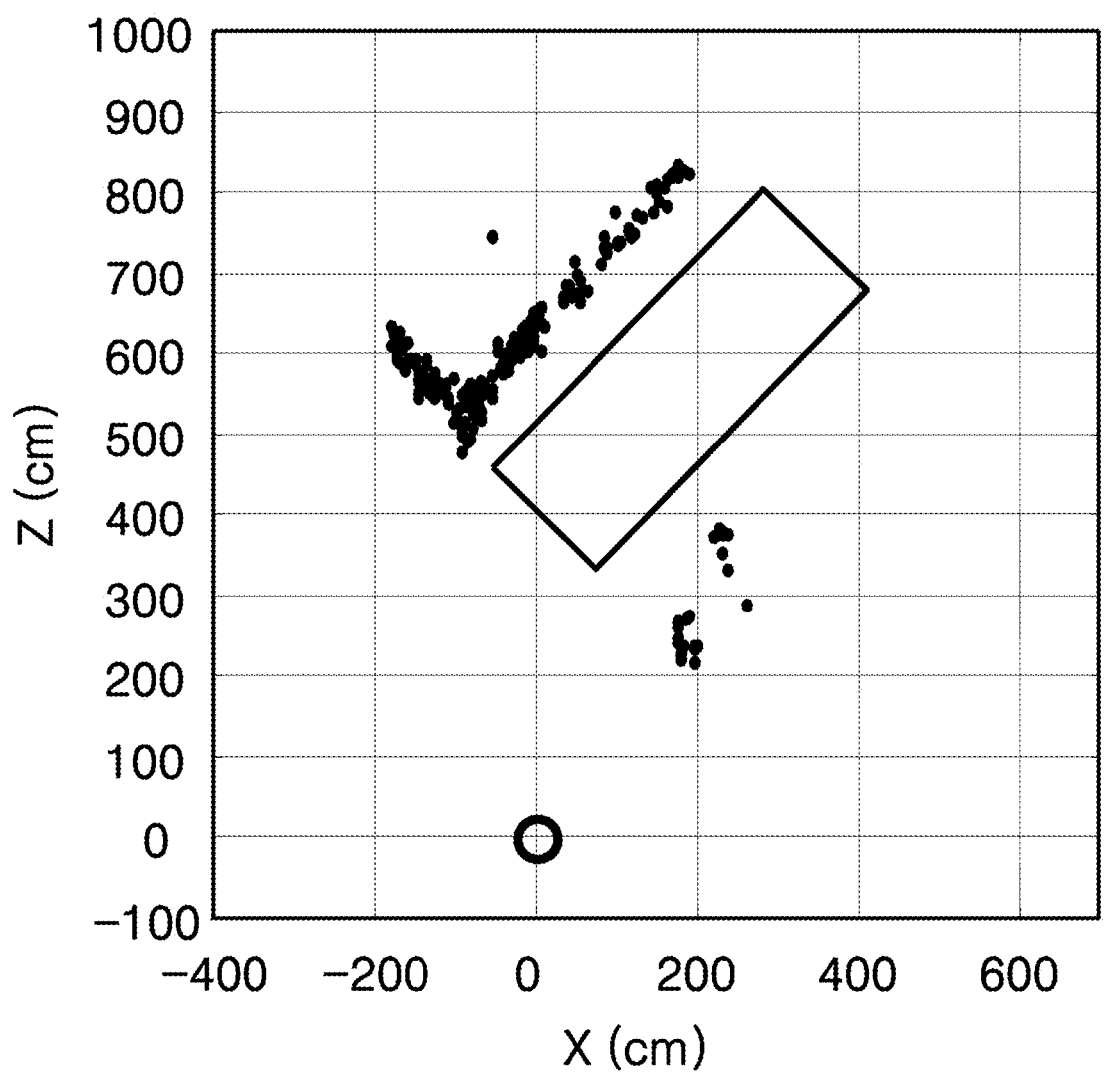
Figure 17B:
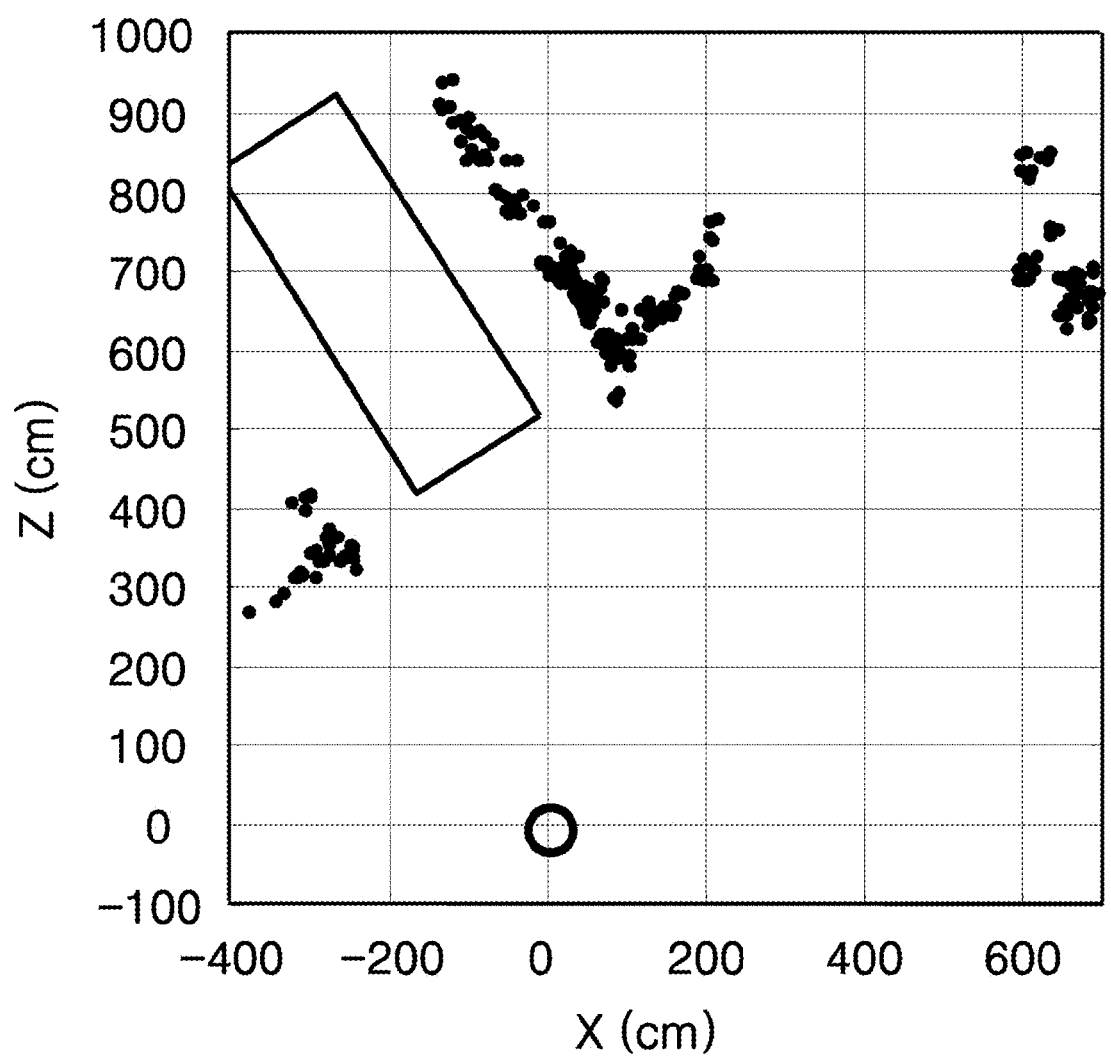
Figure 17B:
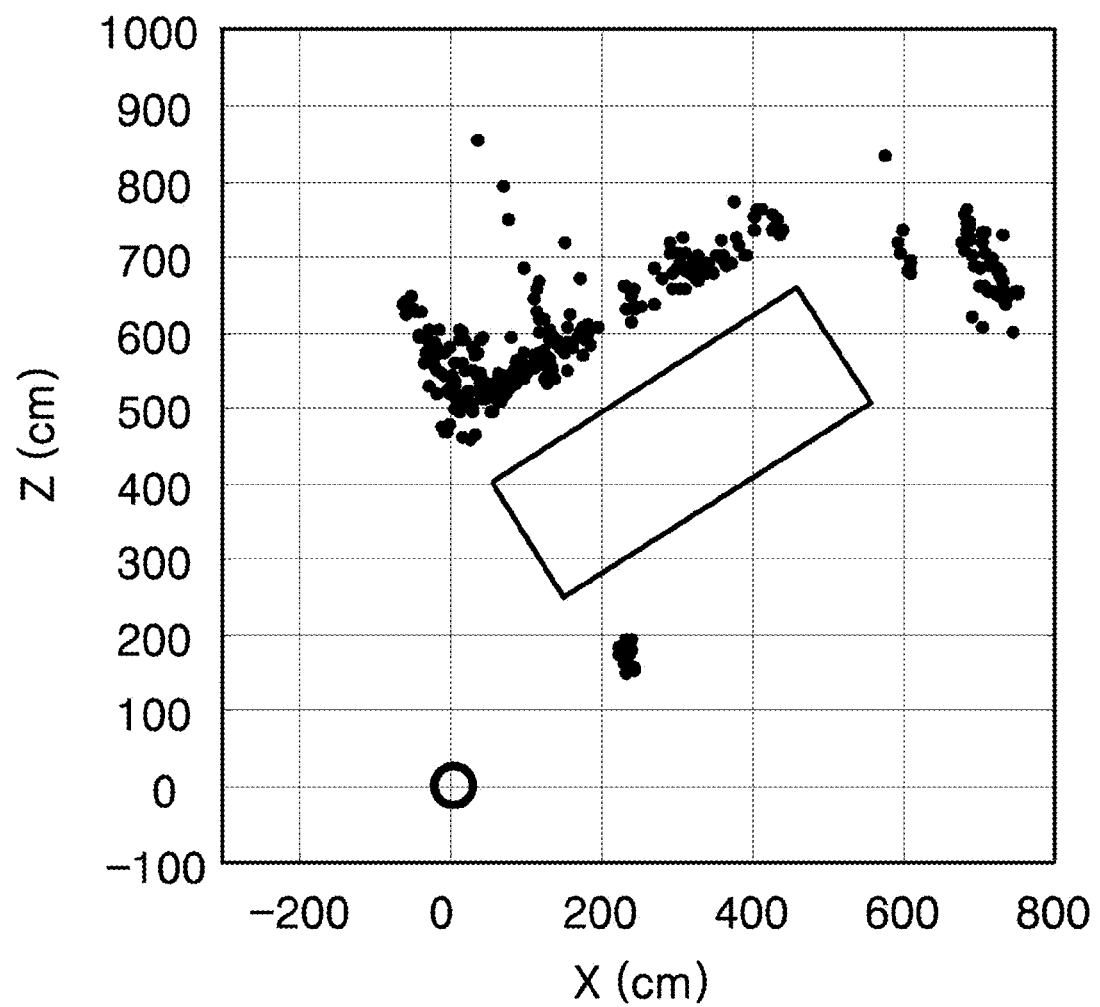
Figure 17C:
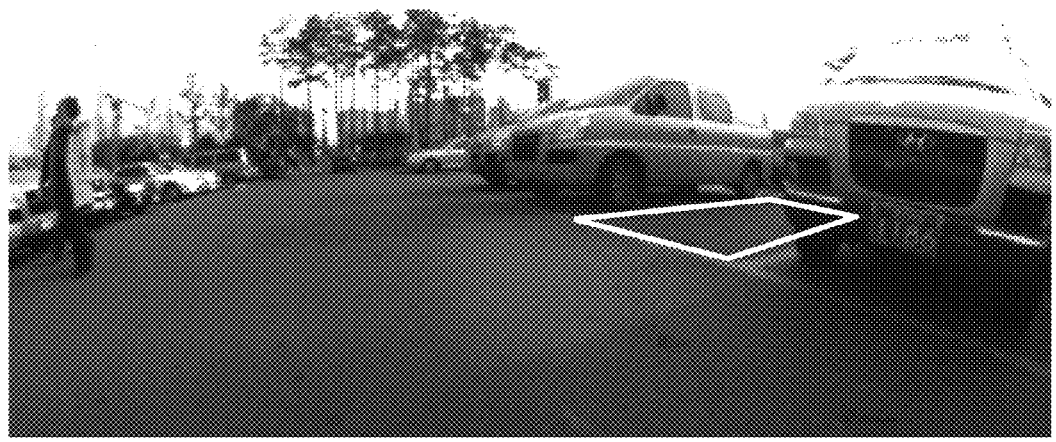
Figure 17C:
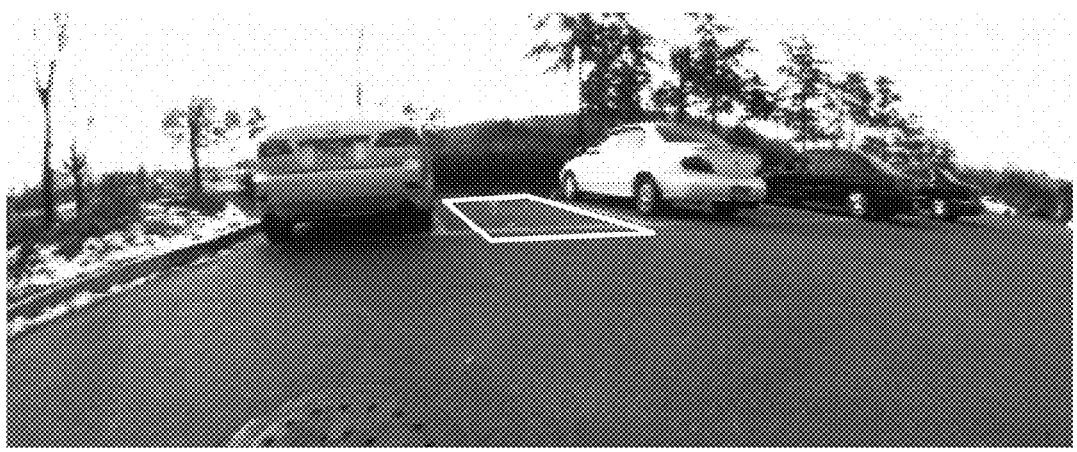
Figure 17C:
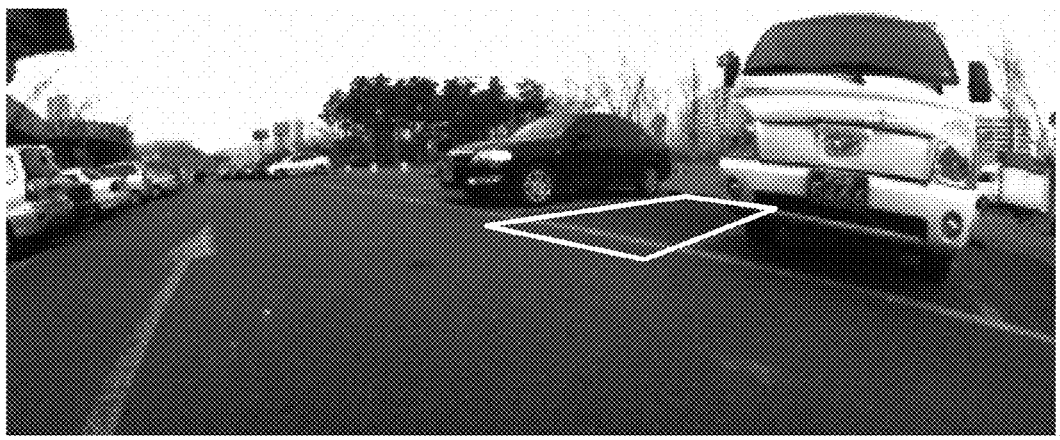
Figure 17D:
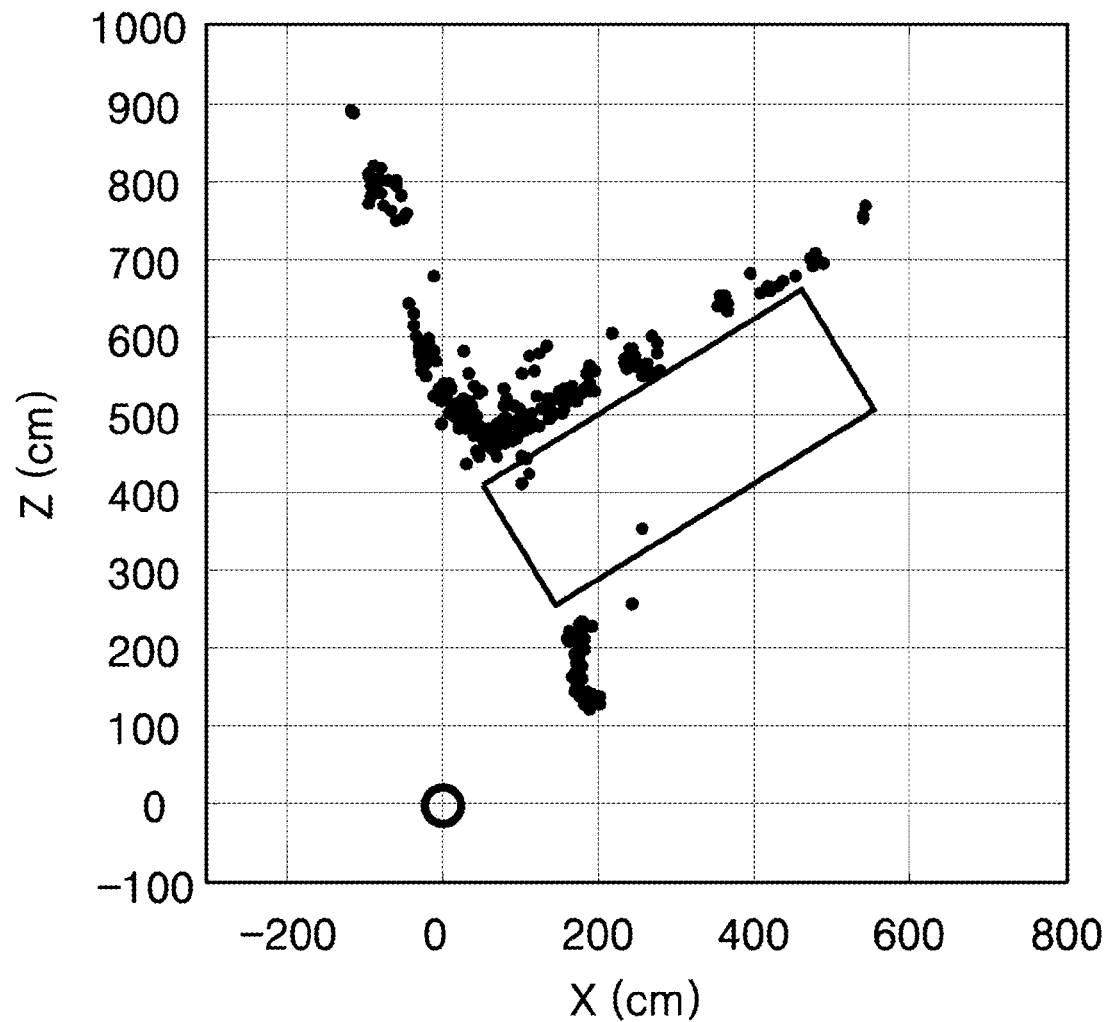
Figure 17D:
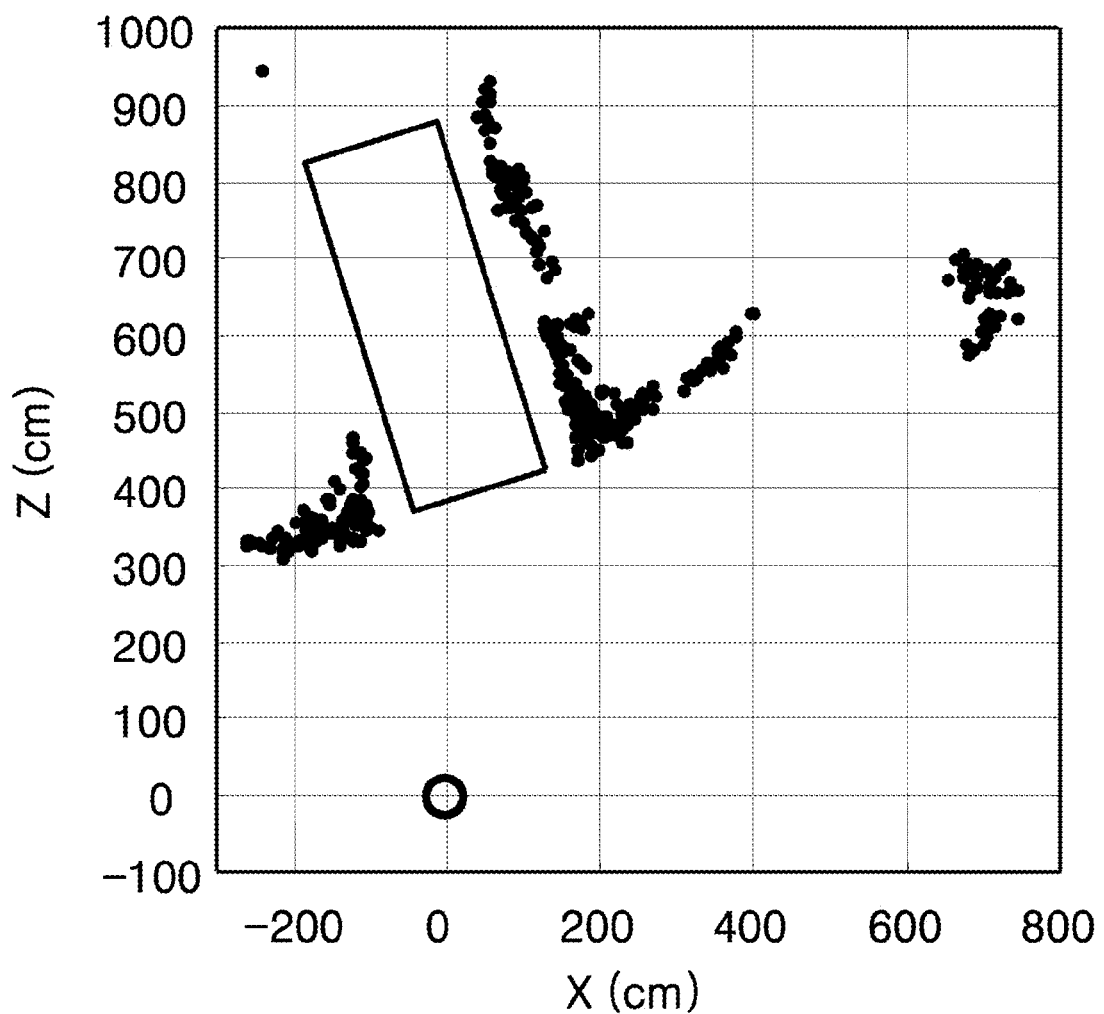
Figure 17D:
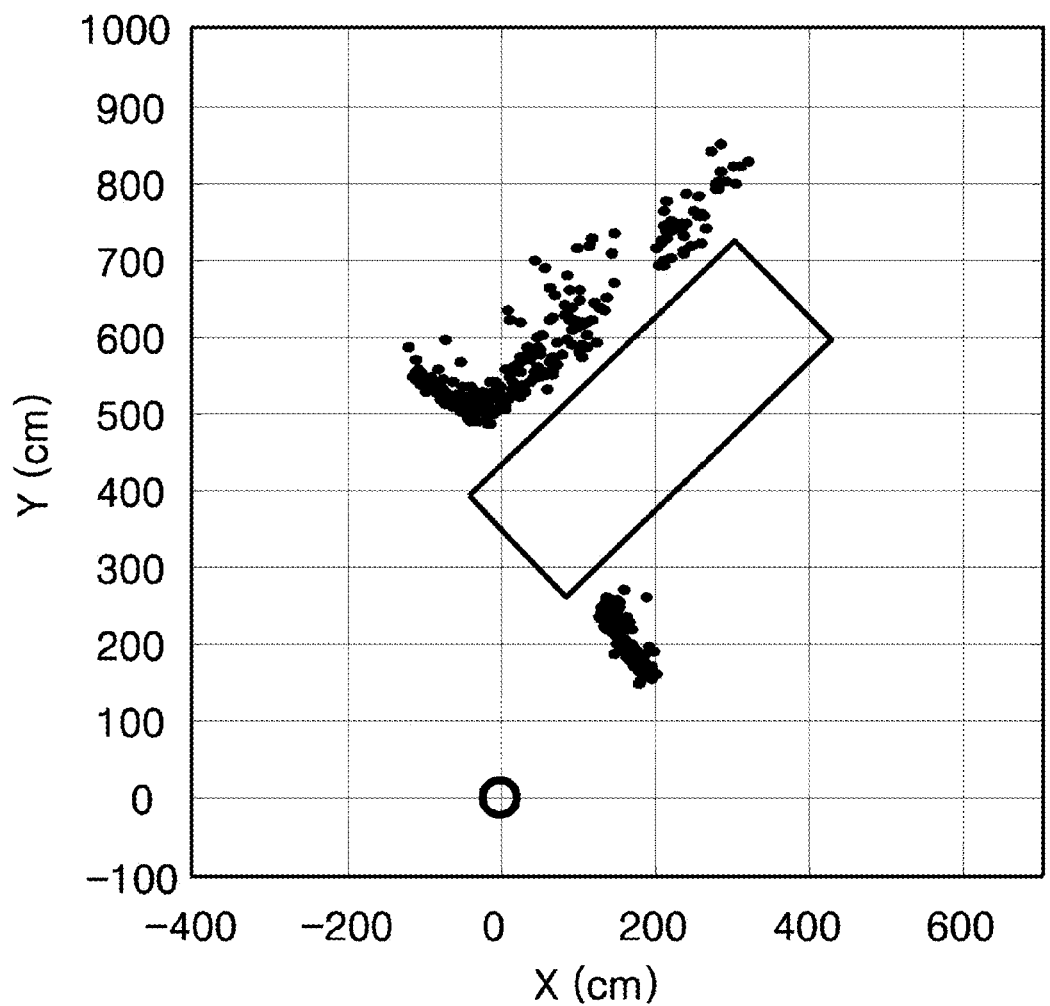

The disclosed system was applied to 154 real parking situations. The ground planes were covered with asphalt, soil, snow, standing water, and parking markers. The automobiles varied in color from dark to bright and they included sedans, SUVs, trucks, vans and buses. The environment included various types of buildings, vehicles, and trees. FIGS. 17A, B, C, D show six successful examples. FIGS. 17Aa-17Ac, 17Ca-17Cc show the last frames of the image sequences and FIGS. 17Ba-17Bc, 17Da-17Dc show the rearview structures corresponding to FIGS. 17Aa-17Ac, 17Ca-17Cc, respectively. In these figures, (0, 0) indicates the camera center.

To decide whether the system succeeded, free parking space on the last frame of the image sequence was displayed. If it was located inside the free space between two adjacent vehicles, the result was considered to be a success. In this way, the system succeeded in 139 situations and failed in 15 situations, so the detection rate was 90.3%.

Figure 18A:
FIGS. 18A, B, C, D show four types of failures.
Figure 18B:
Figure 18C:
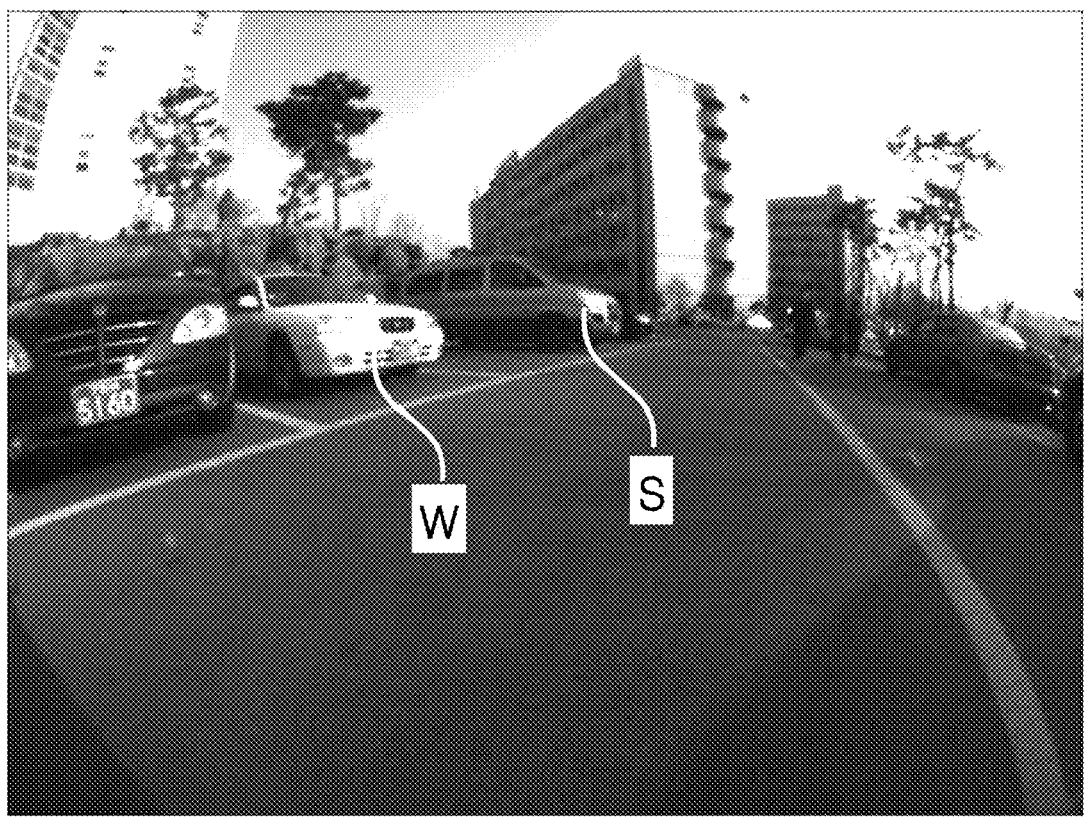
Figure 18D:
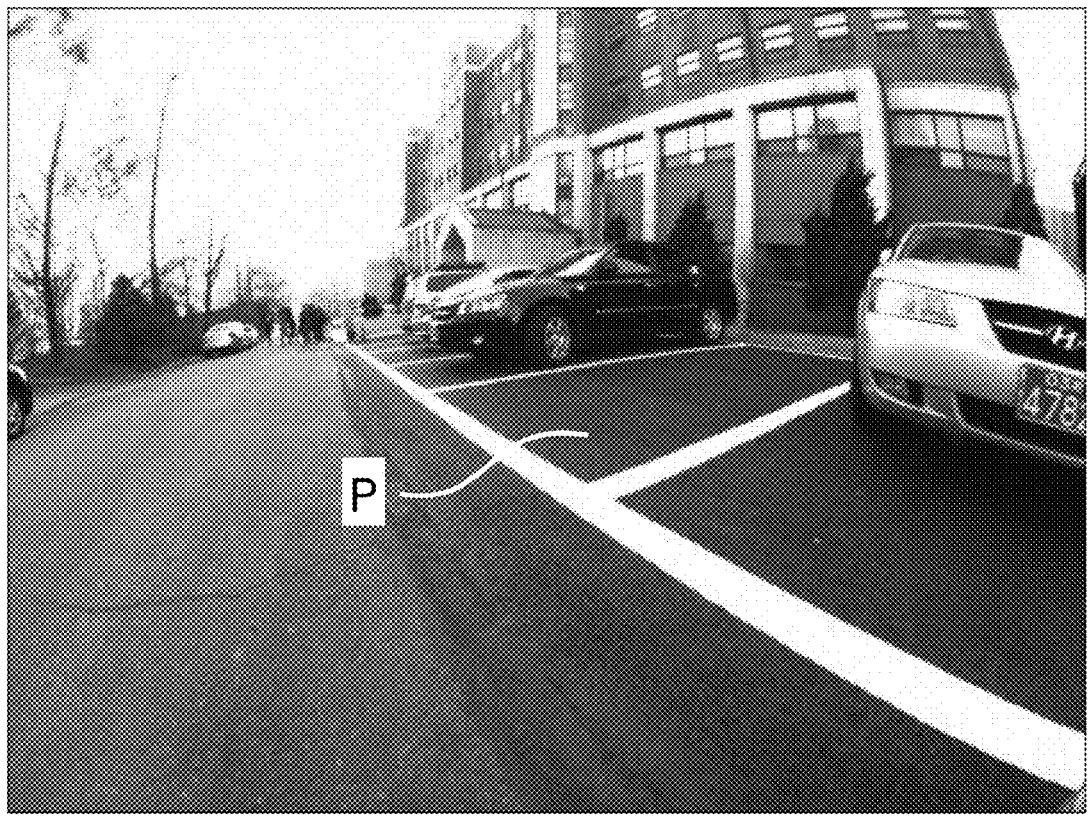

FIGS. 18A, B, C, D show four types of failures due to the reflected sunlight in FIG. 18A, a dark vehicle under a shadowy region in FIG. 18B, a far parking space in FIG. 18C and an uneven ground plane in FIG. 18D.

In FIG. 18A, the sun was strongly reflected on the surface of the adjacent vehicle and the ground plane, so feature point tracking failed. In FIG. 18B, the adjacent vehicle was very dark and it was located in a shadowy region, so few feature points were detected and tracked on the surface of the vehicle. In FIG. 18C, the free parking space was very far from the camera, so the side of the white car at W was more precisely reconstructed than that of the silver van at S. This caused false detection. In FIG. 18D, part of the ground plane on the parking space at P was repaved with asphalt, so the ground plane was not flat. This made the ground plane estimation erroneous. Out of fifteen failures, three could be depicted by FIG. 18A, nine could be depicted by FIG. 18B, two could be depicted by FIG. 18C, and one could be depicted by FIG. 18D.

4.3 Accuracy of Adjacent Vehicle Detection

The disclosed free parking space detection method estimates the corner point and the orientation of the adjacent vehicle and then locates the target space accordingly. Since the detection result depends on the estimation of the corner point and orientation, calculation is performed to obtain their errors for accuracy evaluation. The ground truth of the corner point and the orientation may be obtained by using laser scanner data. The error of the corner points is the Euclidean distance from the estimated point to the measured point and the error of the orientation is the absolute difference between the estimated angle and the measured angle. For this evaluation, 47 image sequences and the corresponding laser scanner data were used. The corner point and the orientation of the adjacent vehicle were estimated 10 times for each image sequence. This is because the reconstructed structure can differ slightly every time due to the parameter estimation results.

Figure 19A:
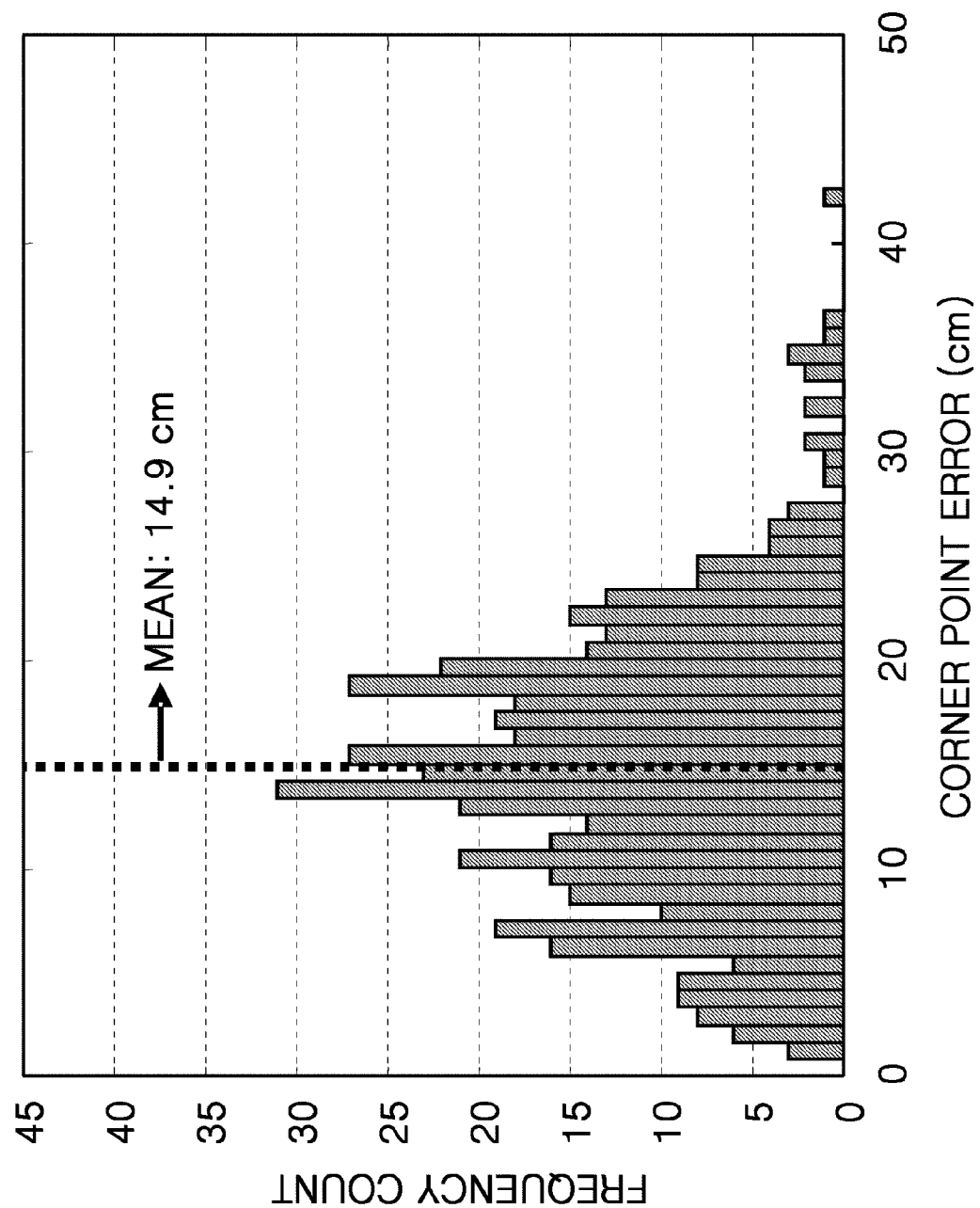
FIGS. 19A, B show evaluation results by using laser scanner data.
Figure 19B:
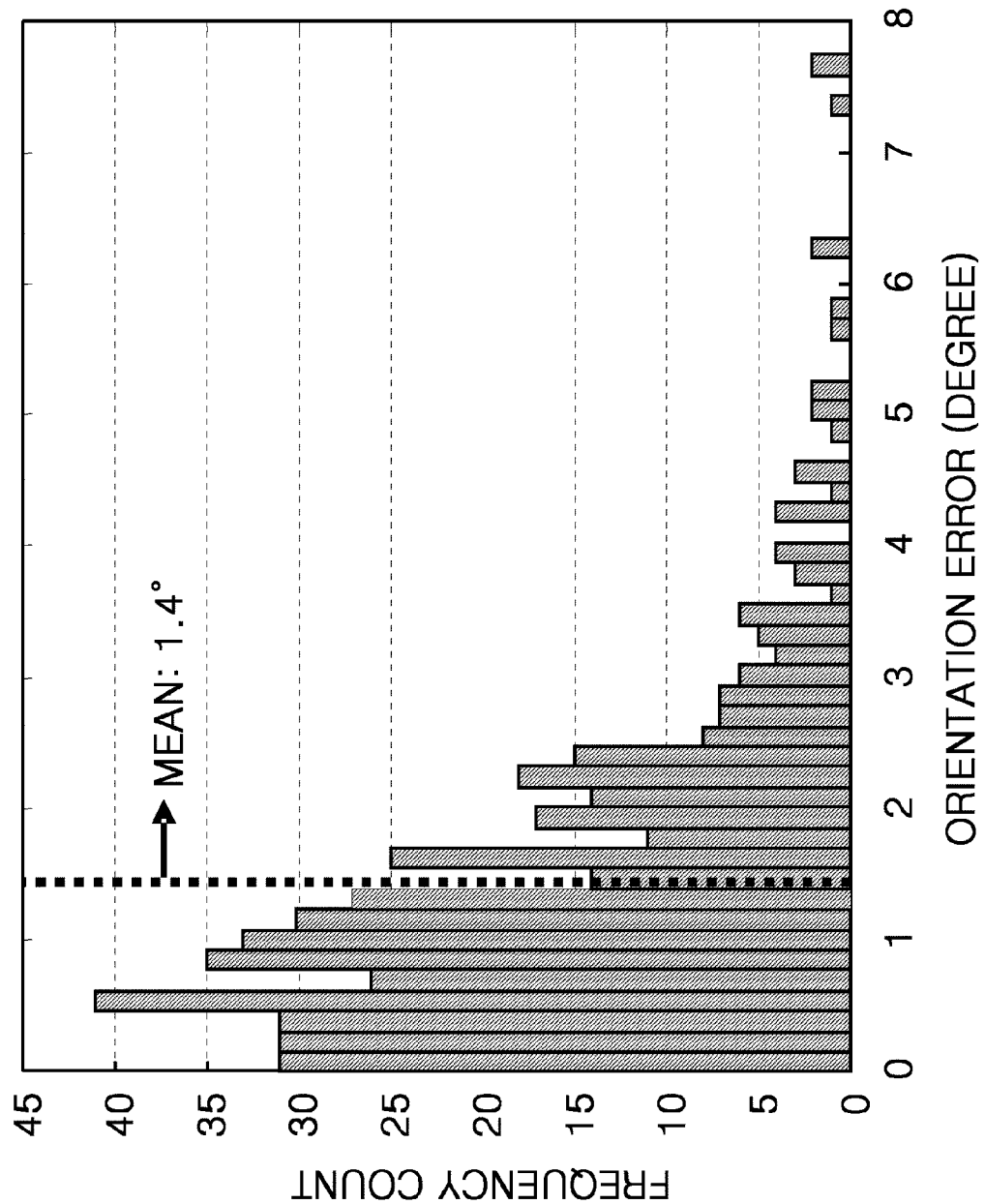

FIGS. 19A, B show evaluation results by using laser scanner data where FIG. 19A shows the corner point error and FIG. 19B shows the orientation error. In FIGS. 19A, B, the errors of the corner point and the orientation are depicted as histograms. The average and maximum errors of the corner point were 14.9 cm and 42.7 cm, respectively. The distance between the corner point and the camera center was between 281.4 cm and 529.2 cm. Since the lateral distance between two adjacent vehicles is approximately between 280 cm and 300 cm in a usual garage parking situation, there is about 50 cm extra room on each side of the vehicle. This means that even the maximum error of the corner point is acceptable for the free parking space localization. The average and maximum errors of the orientation may be 1.4° and 7.7°, respectively. This average error of the orientation is acceptable but the maximum error of the orientation may be somewhat large. This is because the side surfaces of automobiles show few corresponding points due to featurelessness and this makes the orientation estimation difficult. This evaluation shows that the disclosed system produces acceptable results for detecting free parking spaces.

The above exemplary embodiments of the present disclosure have been described for illustrative purposes, and those skilled in the art will appreciate that various modifications, additions and substitutions are possible, without departing from the substantial characteristics of the disclosure. Therefore, exemplary embodiments of the present disclosure have not been described for limiting purposes.

It is to be understood that the present invention is not limited to the embodiments describe above. The scope of the present disclosure is to be interpreted by the following claims and the entire technical idea within the claimed scope is to be interpreted in determining what is included in the invention.

What is claimed is:

1. A vehicle free parking space detection apparatus comprising:
    a feature points tracker for tracking feature points by receiving input images from an image captor and acquiring point correspondences through analyzing the input images;
    a three-dimensional structure generator for generating a three-dimensional structure through three-dimensionally reconstructing the free parking space by using the feature points;
    a three-dimensional mosaic structure generator for generating a three-dimensional structure mosaic through reselecting the feature points to reconstruct the three-dimensional structure by using a de-rotation-based feature selection and mosaic the reconstructed three-dimensional structure by estimating a similarity transformation;
    a metric recoverer for acquiring metric information from the three-dimensional structure mosaic by using an image captor height ratio; and
    a free parking space detector for detecting the free parking space by estimating positions of adjacent vehicles in the three-dimensional structure mosaic.

2. The vehicle free parking space detection apparatus in claim 1, wherein the feature points tracker detects the feature points and tracks the feature points through the input images by using the Lucas-Kanade method.

3. The vehicle free parking space detection apparatus in claim 1, wherein the three-dimensional structure generator selects key frames of the input images and estimates motion parameters and then calculates three dimensional coordinates of the feature points by using a linear triangulation method to generate the three-dimensional structure.

4. The vehicle free parking space detection apparatus in claim 1, wherein the free parking space detector reduces the three dimensional structure mosaic with a top-view, deletes isolated points from neighbors, acquires outline points of the adjacent vehicles with an incoming angle and the distance from the image captor center and estimates a corner point and orientation of the adjacent vehicle, whereby detecting the free parking space.

5. The vehicle free parking space detection apparatus in claim 4, wherein the free parking space detector additionally estimates other adjacent vehicles located opposite the estimated vehicle by setting a circle with a predetermined radius as the search range of the other adjacent vehicles with the center of the circle being located a predetermined distance from the corner point in the orthogonal direction of the orientation.

6. The vehicle free parking space detection apparatus in claim 1, wherein the metric recoverer acquires the image captor height ratio by determining the image captor height in the three dimensional mosaic structure through a tilting angle compensation, a density estimation-based ground plane detection, and a three-dimensional plane estimation-based refinement of the ground plane location and orientation.

7. A vehicle free parking space detection apparatus comprising:
    an image captor for capturing the free parking space to generate input images;
    a user interface for displaying the detected free parking space in an output image;
    a free parking space detector for receiving the input images to track feature points by acquiring point correspondences through analyzing the input images, generating a three-dimensional structure through three-dimensionally reconstructing the free parking space by using the feature points, generating a three-dimensional structure mosaic through reselecting the feature points to reconstruct the three-dimensional structure by using a de-rotation-based feature selection and mosaic the reconstructed three-dimensional structure by estimating a similarity transformation, acquiring metric information from the three-dimensional structure mosaic by using an image captor height ratio, and detecting the free parking space by estimating positions of adjacent vehicles in the three-dimensional structure mosaic to generate the detected free parking space;
    a sensor having a number of sensing units for recognizing driving conditions of the vehicle to generate and deliver vehicle driving condition information;
    a parking assistance controller for receiving the driving condition information from the sensor to estimate a position of the vehicle, generating a path plan to park the vehicle into the free parking space by using the detected free parking space delivered, and generating and delivering control signals to execute the parking into the free parking space;
    an active steering system for steering the vehicle in response to the control signals; and
    an active breaking system for breaking the vehicle in response to the control signals.

8. A method for a vehicle free parking space detection apparatus to detect the free parking space comprising the steps of:
    tracking feature points by receiving input images from an image captor and acquiring point correspondences through analyzing the input images;

generating a three-dimensional structure through three-dimensionally reconstructing the free parking space by using the feature points;

reconstructing the three-dimensional structure through reselecting the feature points by using a de-rotation-based feature selection;

generating a three-dimensional structure mosaic through mosaicking the reconstructed three-dimensional structure by estimating a similarity transformation;

acquiring metric information from the three-dimensional structure mosaic by using an image captor height ratio; and detecting the free parking space by estimating positions of adjacent vehicles in the three-dimensional structure mosaic.

* * * * *